US009430298B2

(12) United States Patent
Yasuda

(10) Patent No.: US 9,430,298 B2
(45) Date of Patent: Aug. 30, 2016

(54) VEHICLE ELECTRONIC CONTROL DEVICE AND DATA-RECEIVING METHOD

(75) Inventor: Koji Yasuda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 85 days.

(21) Appl. No.: 14/378,161

(22) PCT Filed: Feb. 15, 2012

(86) PCT No.: PCT/JP2012/053566
§ 371 (c)(1),
(2), (4) Date: Aug. 12, 2014

(87) PCT Pub. No.: WO2013/121545
PCT Pub. Date: Aug. 22, 2013

(65) Prior Publication Data
US 2014/0366035 A1 Dec. 11, 2014

(51) Int. Cl.
G06F 9/46 (2006.01)
G06F 9/50 (2006.01)
(Continued)

(52) U.S. Cl.
CPC ......... *G06F 9/5083* (2013.01); *G05B 19/0421* (2013.01); *G06F 13/24* (2013.01);
(Continued)

(58) Field of Classification Search
CPC .................................................. G06F 9/5083
USPC ........................................................ 718/105
See application file for complete search history.

(56) References Cited

U.S. PATENT DOCUMENTS 6,484,082 B1 * 11/2002 Millsap ............... H04L 12/4035
701/32.7
6,836,785 B1 * 12/2004 Bakshi ................... H04L 47/28
709/203
(Continued)

FOREIGN PATENT DOCUMENTS

EP 2 053 510 A2 4/2009
JP 5-292126 11/1993
(Continued)

OTHER PUBLICATIONS

Isabell Jahnich et al., "Integrating Dynamic Load Balancing Strategies into the Car-Network", 2008, IEEE.*
(Continued)

Primary Examiner — Wei Zhen
Assistant Examiner — Lanny Ung
(74) Attorney, Agent, or Firm — Oblon, McClelland, Maier & Neustadt, L.L.P.

(57) ABSTRACT

A vehicle electronic control device having a first microcomputer and a second microcomputer connected to an in-vehicle network. The first microcomputer includes a process load level detecting unit that detects a process load level of the first microcomputer, a table in which the process load level is associated with data identification information, and a reception data reducing unit that, in a case where the process load level becomes equal to or greater than a first threshold level, stops receiving one or more data which the first microcomputer has received before the process load level becomes greater than or equal to the first threshold value. The second microcomputer includes a process load level estimating unit that estimates the process load level of the first microcomputer, a substitute data receiving unit that receives data, which the first microcomputer stops receiving, from the in-vehicle network in a case where the process load level estimated by the process load level estimating unit becomes greater than or equal to a second threshold value, and a data transmitting unit that transmits the data received by the substitute data receiving unit to the first microcomputer at a communication timing of serial communication.

13 Claims, 15 Drawing Sheets

(51) Int. Cl.
  *G06F 13/24* (2006.01)
  *G05B 19/042* (2006.01)
(52) U.S. Cl.
  CPC . *G05B2219/2637* (2013.01); *G06F 2209/503* (2013.01); *G06F 2209/508* (2013.01); *G06F 2209/509* (2013.01); *G06F 2209/5022* (2013.01)

(56) References Cited

U.S. PATENT DOCUMENTS

2002/0194251 A1 12/2002 Richter et al.
2008/0320170 A1 12/2008 Yamauchi et al.

FOREIGN PATENT DOCUMENTS

| JP | 9-319720 | 12/1997 |
| JP | 2003-298675 | 10/2003 |
| JP | 2005-322032 | 11/2005 |
| JP | 2006-18600 | 1/2006 |
| JP | 2009-5315 | 1/2009 |
| JP | 2010-160715 | 7/2010 |
| WO | 2010/106403 A1 | 9/2010 |

OTHER PUBLICATIONS

International Search Report issued Apr. 3, 2012, in PCT/JP12/053566 filed Feb. 15, 2012.

* cited by examiner

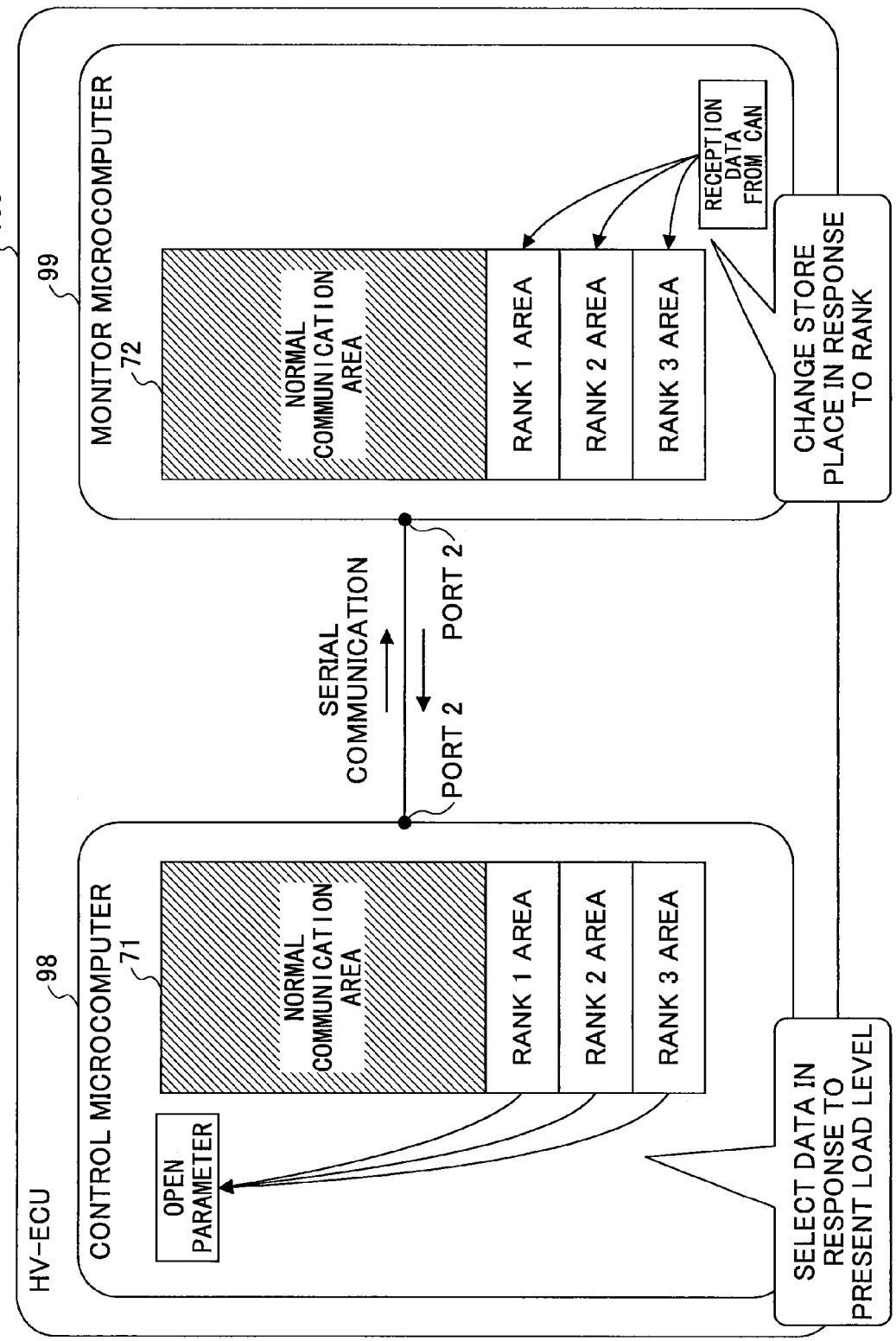

VEHICLE ELECTRONIC CONTROL DEVICE AND DATA-RECEIVING METHOD

TECHNICAL FIELD

The present invention relates to a vehicle electronic control device having a first microcomputer connected to an in-vehicle network and a second microcomputer connected to said in-vehicle network.

BACKGROUND ART

In a vehicle, in order to realize more comfortable traveling and promote fuel saving, electronic control of in-vehicle devices has been progressed. The electronic control is performed by an electronic control unit (ECU: Electronic Control Unit) equipped with an information-processing device such as a microcomputer, but an amount of processes to be performed by one electronic control device is increased due to diversification and high-functionality in the electronic control, which results in tendency of increasing a process load of the microcomputer. It is considered to mount such a high-function microcomputer that can handle a peak of process load beforehand, but it causes a cost increase.

Thus, focusing attention on that a plurality of microcomputers are mounted in some electronic control devices, it is considered to distribute a load between microcomputers. Such a load distribution may be used in a networked PC or server (for example, refer to Patent Document 1). Disclosed in Patent Document 1 is a distribution process management system in which, in a state where calculators of substantially the same processing performance are connected to a network, each calculator records a load applied thereto on a common storage medium connected to each calculator. Each calculator finds a calculator being given a small load at a present time, and requests the calculator to execute a process.

However, because a plurality of microcomputers mounted in an electronic control device have a minimum necessary processing capacity in order to suppress a cost, it is difficult to use a simple load distribution such as disclosed in Patent Document 1. In addition, in many cases, a plurality of microcomputers mounted in one electronic control device have nonuniform processing capacities. Due to this, if, for example, a processing capacity of a microcomputer A is smaller than that of a microcomputer B, there may be a case where processing by the microcomputer B is faster than when the microcomputer A handles the process instead of the microcomputer B because the microcomputer A has a margin in a processing capacity. In addition, it is difficult in regards to not only cost but also size to mount a ROM of the same size in the microcomputer B so that the microcomputer A can handle the process of the microcomputer B instead.

In addition, if a microcomputer A and a microcomputer B having equal processing capacities are mounted in an electronic control device, a cost increase is caused as is the same as the above-mentioned case where a single high-performance microcomputer is mounted even if it is capable of performing a load distribution.

In the meantime, in a case of a vehicle, it is general that a high-performance side microcomputer performs a control process. When a processing load to the microcomputer for controlling becomes high, task omission may happen gradually, but the task omission happens from tasks giving small influence to traveling, and there is no situation where traveling becomes difficult. However, it is not preferable to cause any abnormality to occur in the microcomputer for controlling or in an execution of the tasks. Thus, the other microcomputer may be designed to monitor the microcomputer for controlling. The microcomputer for monitoring monitors a process load of the microcomputer for controlling, and if it is determined that a high-load level is reached, there may be a case where the microcomputer for controlling is reset and reactivated. In this case, the microcomputer for controlling returns (reactivates) extremely faster than a general-purpose PC or the like, but it is not preferable that a control is not performed even in a short time period.

Patent Document 1: Japanese Laid-Open Patent Application No. H09-319720

SUMMARY OF THE INVENTION

Problem to be Solved by the Invention

Considering the above-mentioned problems, it is an object of the present invention to provide an electronic control device that can perform a load distribution between different microcomputers mounted on an electronic control device before a reset is generated in the microcomputers.

Means for Solving the Problem

The present invention features a vehicle electronic control device having a first microcomputer connected to an in-vehicle network and a second microcomputer connected to said in-vehicle network, wherein said first microcomputer includes: process load level detecting means (for example, a load-monitoring part 51) that detects a process load level of said first microcomputer; a table (for example, a reception stop table 58) in which the process load level is associated with data identification information; and reception data reducing means (for example, a reception-data-designating part 52) that stops, in a case where said process load level becomes greater than or equal to a first threshold level, reception of one or more data which said first microcomputer has received from said in-vehicle network before said process load level becomes greater than or equal to said first threshold value, said second microcomputer includes: process load level estimating means (for example, a load-specifying part 64) that estimates said process load level of said first microcomputer; substitute data receiving means (for example, a reception-data-designating part 65) that receives data, which said first microcomputer stops receiving, from said in-vehicle network in a case where said process load level estimated by said process load level estimating means becomes greater than or equal to a second threshold value; and data transmitting means (for example, a transmission-instructing part 66) that transmits in a lump a plurality of data received by said substitute data receiving means to said first microcomputer through serial communication.

Effect of the Invention

There is provided according to the present invention an electronic control device that can perform a load distribution between different microcomputers mounted on an electronic control device before a reset is generated in the microcomputers.

BRIEF DESCRIPTION OF DRAWINGS

FIG. 9A is an example of a diagram for explaining transmission of a CAN frame by DMAC.

Figure 1:
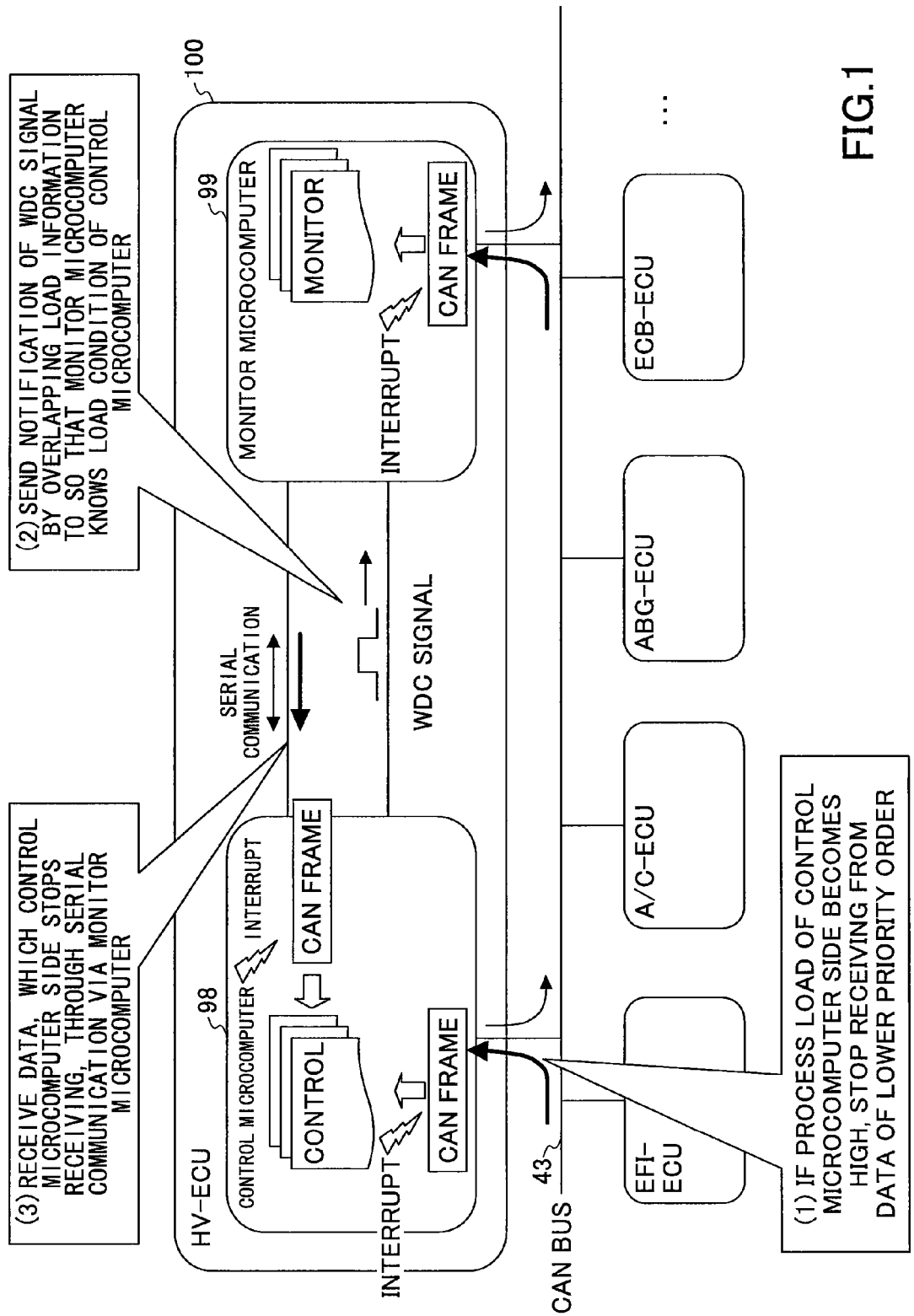
FIG. 1 is an example of a diagram for schematically explaining an outline of a load distribution according to the present embodiment.

EXPLANATION OF REFERENCE NUMERALS 11, 31 CPU
12, 32 RAM
16, 36 DRAM
18, 38 CAN controller
57, 67 period decision table
58 reception stop table
68 reception data designation table
71, 72 DMA buffer
98 control microcomputer
99 monitor microcomputer
100 HV-ECU

BEST MODE FOR CARRYING OUT THE INVENTION

A description will be given below, with reference to the drawings, of a mode for carrying out the present invention.

[Outline of Load Distribution in Electronic Control Device]

FIG. 1 is an example of a diagram schematically illustrating an outline of a load distribution of according to an embodiment. An HV-ECU 100 is connected to a CAN bus 43. The HV-ECU 100 is capable of mutually communicating with other ECUs (EFI-ECU: engine ECU, A/C-ECU: air-conditioner ECU, ABG-ECU: air-bag ECU, ECB-ECU: brake ECU) that are connected to the CAN bus 43. In addition, the HV-ECU 100 includes a control microcomputer 98 and a monitor microcomputer 99.

As a factor of increasing a process load of an ECU, there is an increase in engine revolution, vehicle speed or the like, and this is mainly for a reason that an event interrupt tends to occur, which increases a frequency of an interrupt process. If a frequency of an interrupt process increases, a process load becomes high because context switching occurs many times. Such an event interrupt also occurs due to a reception interrupt from the CAN bus 43.

Because a large part of a task started by an external interrupt has a priority of higher than middle to low level, if an interrupt occurs in many times, a delay may occur in a process of other tasks of low-priority order or a task omission may tend to occur. Additionally, because the control microcomputer 98 in this state has a high process load, it is highly possible that the monitor microcomputer 99 resets the control microcomputer.

Focusing attention that an interrupt process by a reception interrupt in CAN communication causes an increase in a process load of the control microcomputer 98, the HV-ECU 100 according to the present embodiment performs a load distribution as explained below.

(1) The control microcomputer 98 monitors a process load, and, if a process load becomes high, stops reception of a CAN frame having a low priority order.

(2) Conventionally, the control microcomputer 98 periodically transmits a WDC signal to the monitor microcomputer 99. The control microcomputer 98 according to the present embodiment overlaps process load information on the WDC signal, and transmits it to the monitor microcomputer 99.

(3) If the process load of the control microcomputer 98 becomes high, the monitor microcomputer 99 starts a reception of CAN frames, which reception the control microcomputer 98 has stopped. Then, a plurality of CAN frames are transmitted at once (at one cycle) to the control microcomputer 98 by using serial communication. That is, the monitor microcomputer 99 performs substitute reception to receive CAN frames instead of the control microcomputer 98, and plays a roll of a gateway for can frames with respect to the control microcomputer 98. A reception interrupt occurs when the control microcomputer 98 receives CAN frames from the monitor microcomputer 99, but a frequency thereof can be greatly decreased as comparing to the reception interrupt of CAN frames.

According to the control mentioned above, first, the control microcomputer 98 can reduce a process load because it reduces a number of receptions of CAN frames, which decreases reception interrupt. Additionally, because the control microcomputer 98 receives CAN frames from the monitor microcomputer 99, there is less occurrence of omission of reception. The frequency of the control microcomputer 98 receiving CAN frames from the monitor microcomputer 99 is smaller than the frequency of the control microcomputer 98 receiving CAN frames from the CAN bus 43. Therefore, even if a comparison is made with a case of receiving the same amount of CAN frames, an increase in the process load can be suppressed further by receiving CAN frames from the monitor microcomputer 99 than the case of receiving CAN frames directly from the CAN bus 43.

It should be noted that although communication based on a CAN protocol will be explained below as an example, the substitute reception according to the present embodiment can be suitably applied to a communication protocol in which a microcomputer performs a reception interrupt when receiving data from an in-vehicle network.

Moreover, it is assumed that each of the control microcomputer and the monitor microcomputer repeatedly performs the process mentioned below for each cycle period. Although the cycle period of the monitor microcomputer is not necessarily equal to that of the control microcomputer, the cycle periods are set to the same value in the present embodiment for the sake of explanation. The cycle period is, for example, several to several tens of milliseconds.

[Configuration Example]

Figure 2:
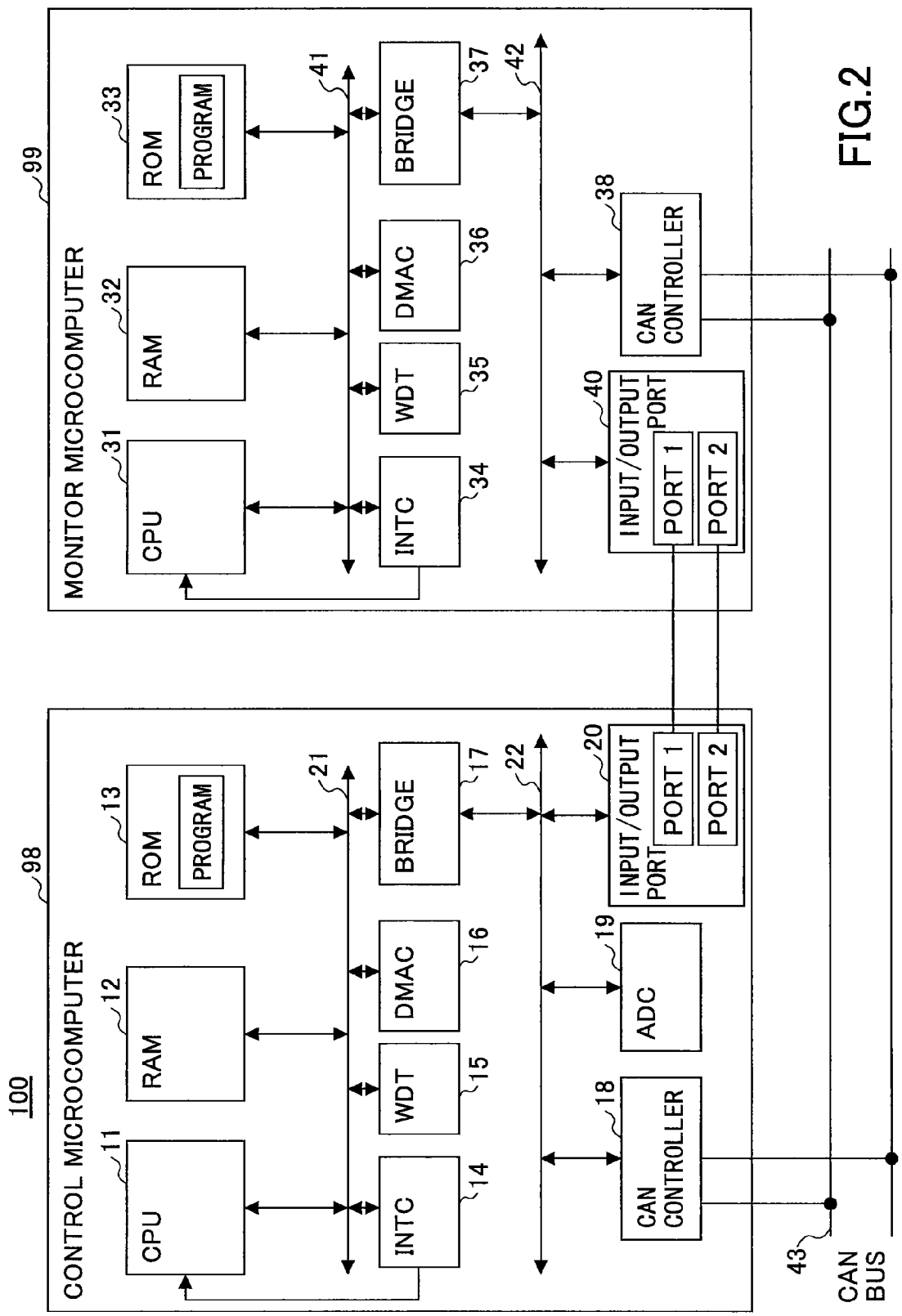
FIG. 2 is an example of an outline block diagram of a control microcomputer and a monitor microcomputer that are mounted on HV-ECU.

FIG. 2 is an example of an outline block diagram of the control microcomputer and the monitor microcomputer 99 that are mounted in the HV-ECU 100. It should be noted that it may includes three or more microcomputers. The control microcomputer 98 includes a CPU 11, a RAM 12, a ROM 13, an INTC 14, a WDT 15 and a DMAC 16 that are connected to a main bus 21, and further includes a CAN controller 18, an ADC 19 and an input/output port 20 that are connected to a peripheral bus 22. The main bus 21 and the peripheral bus 22 are connected through a bridge 17.

Although the monitor microcomputer 99 is a microcomputer having a performance lower than the control microcomputer 98, a microcomputer having such a low performance is not necessarily applied to the present embodiment. The reason that the performance of the monitor microcomputer 99 can be low is that it is sufficient that monitoring of a process load of the monitor microcomputer 99, a reset of the control microcomputer 98, and an accumulation of CAN frames can be performed. In addition, as an index to a performance, there is a core number, data size of a register and a bus, a clock frequency, a size of RAM and ROM, a process generation, etc.

The CPU 11 performs a process necessary for the HV-CPU 100 by executing a program stored in the ROM 13. The RAM 12 is a work memory used when the CPU 11 executes a program. ROM 13 stores system programs such as an operating system (OS), a device driver, middleware, etc.

The reception control of CAN frames explained in the present embodiment is not limited to the HV-ECU 100, and any ECU mounted with two microcomputers is suitably applicable. In a case where the reception control of CAN frames is applied to the HV-ECU 100, the CPU 11 performs the following process. First, reception is made for an accelerator opening degree, vehicle speed information, depress condition of a brake pedal, and a state of charge (SOC) of a battery. The CPU 11 decides requested torque based on the accelerator opening degree and the vehicle speed by referring to a map in which the requested torque is registered in association with the accelerator opening degree and the vehicle speed. Then, it decides an engine revolution and motor revolution by referring to an optimum fuel consumption line or the like so that a drive power corresponding to the requested torque is output to a ring gear. The CPU 11 sends the decided engine revolution and motor revolution to the engine ECU and the motor ECU through the CAN bus 43.

The INTC 14 monitors an interrupt register, and makes arbitration for interrupt requests from peripheral devices based on an interrupt priority order, and sends a notification to the CPU 11. Thereby, the CPU 11 executes, for example, an interrupt service routine (ISR) to start a task determined in response to the interrupting peripheral devices.

The WDT 15 is a circuit to perform abnormality detection (microcomputer reset, CPU interrupt, etc.) by counting an operation clock and when the counted time reaches a previously determined reset time (overflow). In the present embodiment, the monitor microcomputer 99 performs the same function as the WTD 15, and, thus, the WDT 15 is not necessarily provided.

The DMAC 16 moves data between the RAM 12 and peripheral circuits and within the RAM 12. When the CPU 11 sends data to an external part from the input/output port 20, the CPU 11 sets an address of data stored in the RAM 12 to the DMAC 16 and designates the peripheral circuit of a destination to send. The DMAC 16 writes data, which is read from the RAM 12, in the input/output port 20. Additionally, if the CPU 11 receives data from an external part, when data reaches the input/output port 20, the DMAC 16 detects it and transfers the data to the RAM 12. After the reception is ended, the DMAC 16 makes an interrupt request to the INTC 14, and, thereby, the CPU 11 can read data of the RAM 12. In addition, the address in which the DMAC 16 writes data at a reception time is previously determined. The DMAC 16 of the control microcomputer 98 performs reception of data mainly from the monitor microcomputer 99.

The bridge 17 absorbs a difference in frequency between the main bus 21 and the peripheral bus 22, and communicably connects circuits connected to the main bus 21 to the circuits connected to the peripheral bus 22. The CAN controller 18 is a communication circuit for the control microcomputer 98 to communicate with other ECUs connected to the CAN bus 43. After the CAN controller 18 notifies the DMAC 16 of the reception of CAN frames, the DMAC 16 reads the CAN frames from the reception buffer of the CAN controller 18 and stores it in the RAM 12. After the reception is ended, the DMAC 16 notifies the CPU 11 of the reception of CAN frames by sending an interrupt request to the INTC 14. It should be noted that there may be a case where the CAN controller 18 has the function of the DMAC 16.

The ADC (A/D controller) 19 converts an analog signal of a sensor connected to the control microcomputer 98 into a digital signal, and outputs a control signal to an actuator or the like. The input/output port 20 is an interface of input and output with peripheral circuits, and a plurality of input/output ports 20 are prepared for each of the peripheral circuits. Additionally, there may be a case where multiplexer ports are prepared. For example, the monitor microcomputer 99, a sensor, a switch, etc., are connected to the input/output port 20. In the present embodiment, ports 1 of the control microcomputer 98 and monitor microcomputer 99 are connected to each other, and ports 2 of the control microcomputer 98 and monitor microcomputer 99 are connected to each other.

The monitor microcomputer 99 has the same configuration as the control microcomputer 98. Although the ADC is omitted in the figure because the monitor microcomputer 99 does not control actuators or the like, the monitor microcomputer 99 may have an ADC or may have circuits which the control microcomputer 98 does not have.

The CPU 31 performs a process necessary for monitoring the control microcomputer 98 by executing a program stored in the ROM 33. The functions of the DMAC 36 and the CAN controller 38 are the same as the monitor microcomputer 99.

Figure 3:
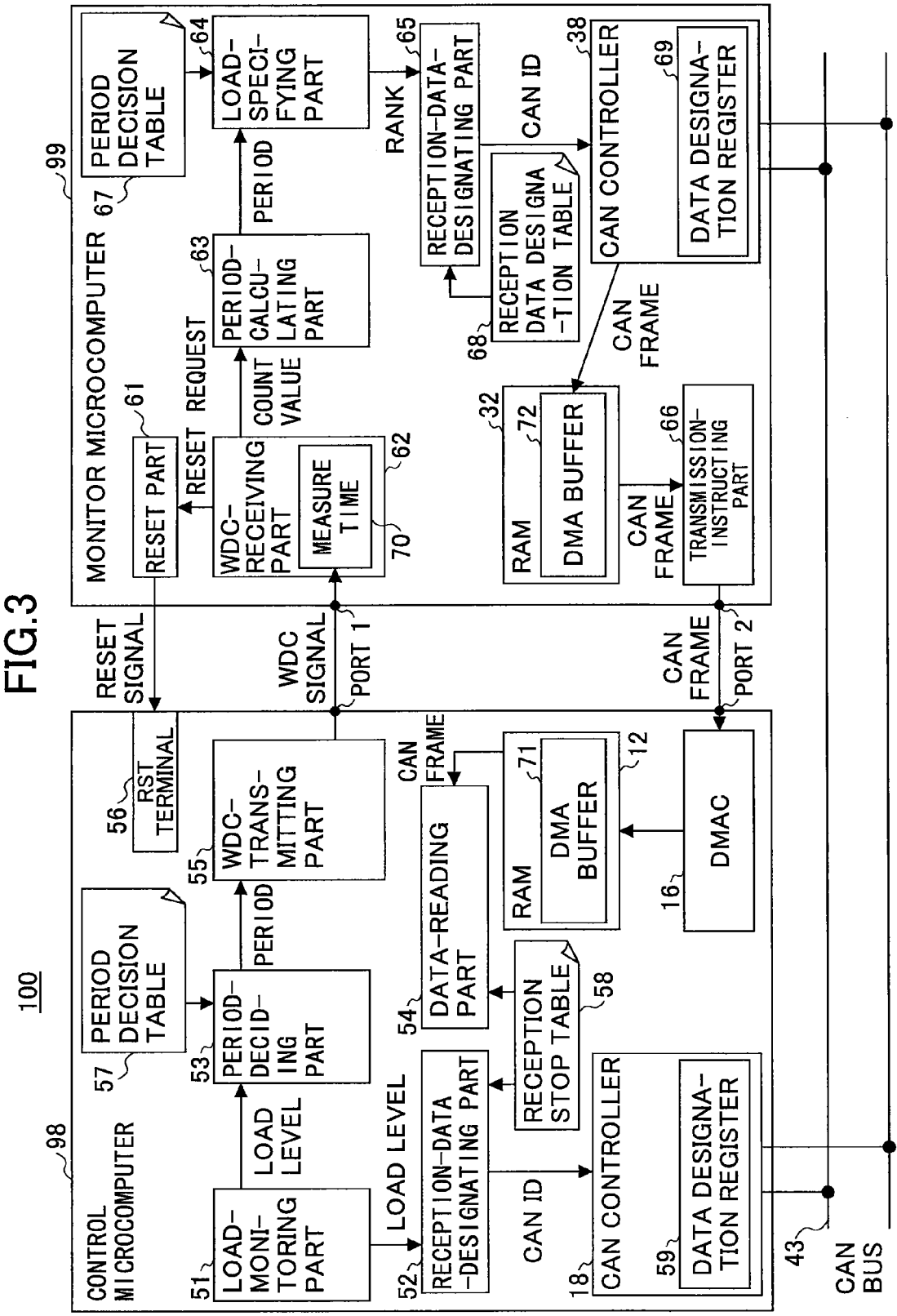
FIG. 3 is an example of a functional block diagram of the control microcomputer and the monitor microcomputer.

FIG. 3 is an example of a functional block diagram of the control microcomputer 98 and the monitor microcomputer 99. Each function block of the control microcomputer 98 is realized by the CPU 11 executing a program in association with other hardware. Each function block of the monitor microcomputer 99 is realized by the CPU 31 executing a program in association with other hardware.

The control microcomputer 98 includes a load-monitoring part 51, a period-deciding part 53, a reception-data-designating part 52, a data-reading part 54 and a WDC-transmitting part 55. The monitor microcomputer 99 includes a WDC-receiving part 62, a period-calculating part 63, a load-specifying part 64, a reset part 61, a transmission-instructing part 66 and a reception-data-designating part 65.

The load-monitoring part 51 monitors a process load to the control microcomputer 98. A monitoring method of a process load will be described later. The period-deciding part 53 calculates a period of the WDC signal in response to the process load (more specifically, a load level), and sends an instruction to the WDC-transmitting part 55. Although the period is set longer as the process load becomes higher as mentioned later, adversely, the period may be set longer as the process load becomes lower.

The WDC-transmitting part 55 transmits a WDC signal, which is a pulse signal of which high and low are switched at a period instructed by the period-calculating part 63, to the monitor microcomputer 99 through the port 1. The reception-data-designating part 52 designates CAN frames, which the CAN controller 18 receives in response to the process load (more specifically, a rank) monitored by the load-monitoring part 51. The data-reading part 54 reads the CAN frames stored in the DMA buffer 71, and stores it in the RAM 12 so that a program can be used in a control.

The WDC-receiving part 62 of the monitor microcomputer 99 receives the WDC signal transmitted by the WDC-transmitting part 55 through the port 1. Additionally, the WDC-receiving part 62 includes a measure time register 70 for counting an operation clock, and clears a count (measure time) of the measure time register 70 at either the rising edge or the falling edge of the WDC signal (the measure time register 70 may be one that counts up or one that counts down). The measure time register 70 counting until a predetermined maximum measure time is referred to as an overflow, and when the overflow occurs, the WDC-receiving part 62 sends a reset request to the reset part 61. The reset part 61 resets the control microcomputer 98 by transmitting a reset signal to an RST terminal 56 of the control microcomputer 98.

The period-calculating part 63 calculates a period of the WDC signal. That is, the period of the WDC signal is calculated from a number of times of switching between high and low in a unit time. The load-specifying part 64 specifies a process load (a rank mentioned later) of the control microcomputer 98 based on the period of the WDC signal. The reception-data-designating part 65 designates the CAN frames, which the CAN controller 38 receives, in response to the process load specifies by the load-specifying part 54.

As mentioned above, the CAN frames received by the CAN controller 38 are stored in the DMA buffer 72 of the RAM 32. The transmission-instructing part 66 transmits the CAN frames of the DMA buffer 72 to the control microcomputer 98 for each predetermined cycle period. Thereby, the CAN frames accumulated in the DMA buffer 72 can be transmitted to the control microcomputer 98 at once. For example, if there are three CAN frames and if the control microcomputer 98 receives them, three reception interrupts may occur, however, only one reception interrupt occurs in the present embodiment.

It should be noted that the transmission-instructing part 66 is included in the monitor microcomputer 99 in FIG. 3, there are not a small number of cases where the control microcomputer 98 has a transmission-instructing part (for the sake of distinguish, referred to as transmission-instructing part B). In such a case, the transmission-instructing part B sends a communication start request to the transmission-instructing part 66 of the monitor microcomputer 99, and the transmission-instructing part 66 sends a preparation completion signal to the control microcomputer 98. Upon reception of the preparation completion signal, the transmission-instruction part B starts communication, and the transmission-instructing part 66 transmits the CAN frames of the DMA buffer 72 to the control microcomputer 98.

As mentioned above, either the control microcomputer 98 or the monitor microcomputer 98 can be a communication master.

[Regarding Process Load]

Figure 4:
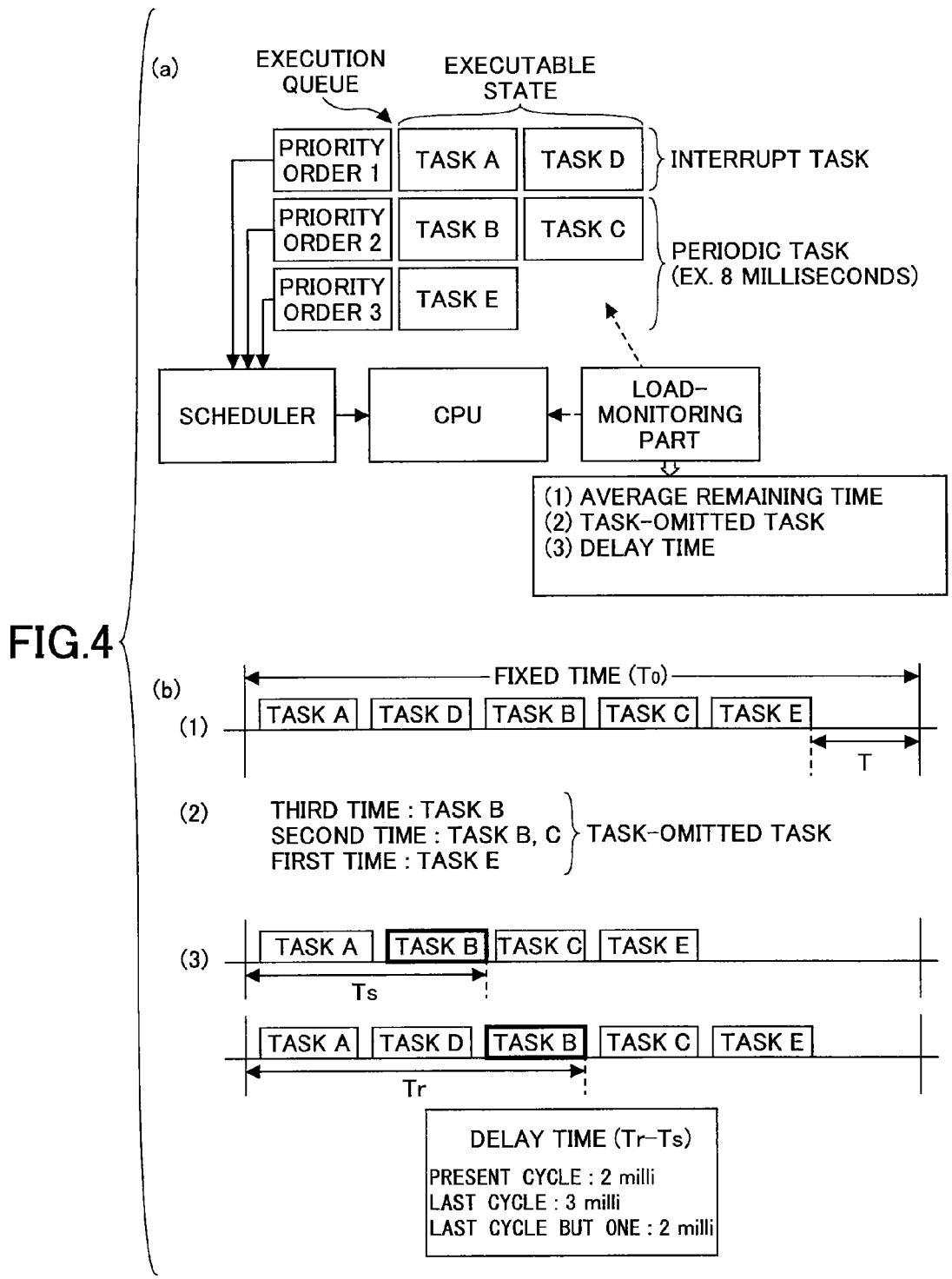
FIG. 4 is an example of a diagram for explaining a process load of the control microcomputer.

FIG. 4 is an example of a diagram for explaining a process load of the control microcomputer 98. The HV-ECU 100 is capable of performing a multi-task process, which is to time-divisionally process a plurality of tasks. A scheduler provided by an OS or the like executes and controls each task created by the program making a system call based on a TCB (task control block). Registered in the TCB are, for example, a task ID and a start address, end address, status, priority order and context of a task.

A trigger of starting each task is previously determined. For example, tasks A and D are interrupt tasks that are activated by an event interrupt, and tasks B, C and E are periodic tasks that are activated by means of software. The tasks A and D are activated by making a system call and changing the "status" of the TCB to an executable state when a reception interrupt of CAN frames or a sensor interrupt occurs. Additionally, the tasks B, C and E are activated by making a system call and changing the "status" of the TCB to an executable state after a cycle period has passed.

The scheduler monitors the TCB, and registers a task in an execution queue based on a priority order by referring to a priority order of a task of which status has been changed to the executable state. The scheduler (more specifically, a dispatcher) assigns tasks to the CPU in an order of priority. Tasks having the same priority order are assigned to the CPU in an order of being changed to the executable state.

The load-monitoring part 51 monitors process load using a state of execution of a task by the CPU 11. For example, a process load is monitored using an average remaining time, a task-omitted task, a delay time, etc.

(1) Average Remaining Time

A number of periodic tasks or an execution time of the periodic tasks is designed so that it can be completed within a fixed time unless a number of interrupt tasks is large. On the other hand, the cycle period is fixed. Thus, as a number of interrupt tasks increases, the periodic task, of which priority order is relatively low, is hardly executed, and, thereby, the execution time of the periodic task is delayed. The process load becomes larger as the number of tasks becomes larger.

The average remaining time is a numerical value representing it, and can be calculated as follows. A cycle period is T0, and a remaining time obtained by subtracting a completion time of the endmost periodic task from the cycle period T0 is set to T.

$$\text{average remaining time} = (T0 - T)/T \times 100$$

It is appreciated that a process load is larger as the average remaining time is smaller.

(2) Task-Omitted Task

There may be a case where a periodic task is not executed during the cycle period T0 due to many interrupt tasks having been activated. In this case, if a next cycle is started, no new task is activated because a periodic task has already been activated. Alternatively, a periodic task is newly activated, but the scheduler deletes the task of the execution queue and registers the newly activated task in the execution queue. The task-omitted means that a preciously determined number of tasks are not executed as mentioned above.

The load-monitoring part 51 detects and records tasks deleted by the task-omission for each cycle. For example, tasks deleted by the task-omission for the last three cycles are detected and recorded. Then, a number of the task-omitted tasks for the three cycles are counted. It is appreciated that as this number is larger, the process load is larger. Additionally, it can be simply determined as the process load is high if there is a task-omitted task for each of three consecutive cycles.

(3) Delay Time

Because the periodic task is activated for each cycle, an execution completion time in standard process load is determined. For example, focusing attention to the task B, the standard execution completion time in a case where only one interrupt task exists is Ts. On the other hand, if a number of interrupt tasks is increased, an actual execution completion time Tr of the task B is delayed. Accordingly, an index that delay time=execution completion time Tr—standard execution completion time Ts can be used as an index of a process load.

The load-monitoring part 51 calculates the delay time for each cycle, and if the delay time becomes larger than or equal to a threshold value, the load-monitoring part 15 records the delay time. If the process load is increased, the delay time is recorded for each cycle. The load-monitoring part 51 calculates, for example, an average of delay times in the several latest times. It is appreciated that the process load is increased as the delay time becomes long. Additionally, it can be simply determined that a process load is high if a cycle in which the delay time is recorded continues for n or more times.

The load-monitoring part 51 acquires a process load using, for example, the following formula. α, β, γ are factors for weighting.

process load=(α task-omitted task+β delay time)/γ average remaining time

A description will be given on the assumption that the load-monitoring part 51 divides a process load into seven levels ("process load 1 through 7", an order in which first has the lowest load). Naturally, it can be divided into levels more than or less than seven levels.

[Decision of Period]

Figure 5:
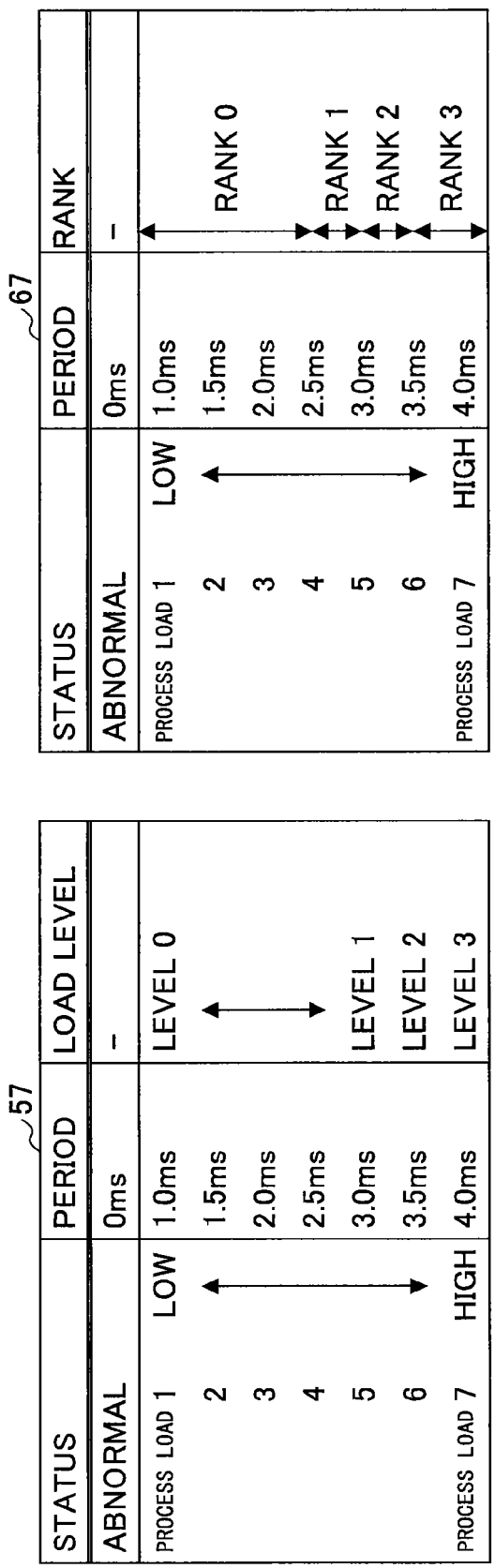
FIG. 5 is an example of an illustration indicating period decision tables in which a relationship in period between a process load and a WDC signal is registered.

A description will be given, with reference to FIG. 5, of a decision of a period of a WDC signal by the period-deciding part 53 of the control microcomputer 98. FIG. 5 is an example of an illustration of period decision tables 57, 67 in which a relationship in period between a process load and a WDC signal is registered. Periods (1.0 to 4.0 milliseconds) are associated with the process loads 1 to 7. For example, the period of the process load 1 is 1.0 millisecond, the period of the process load 2 is 1.5 milliseconds, the period of the process load 3 is 2.0 milliseconds, the period of the process load 4 is 2.5 milliseconds, the period of the process load 5 is 3.0 milliseconds, the period of the process load 6 is 3.5 milliseconds, and the period of the process load 7 is 4.0 milliseconds.

In addition, the "load levels" corresponding to the periods are values of four levels which substitute for the process loads 1 through 7. The reason for substituting in four levels is merely making the explanation easy, and the process loads 1 through 7 can be used without change in the reception control of CAN frames. The CAN frames received by the control microcomputer 98 can be controlled more precisely as a number of kinds of load level becomes large. Specifically, if a number of kinds of CAN frames received by the control microcomputer 98 is ten, the load level can be divided into ten levels so that the CAN frames received can be reduced one by one for each time the load level goes higher by one level.

The period decision table 67 is generally the same as the period decision table 57, but is different in boundaries when the "period" is divided into four levels. That is, the period of greater than or equal to 1.0 milliseconds and smaller than 2.5 milliseconds is substituted by a load rank 0, the period of greater than or equal to 2.5 milliseconds and smaller than 3.0 milliseconds is substituted by a load rank 1, the period of greater than or equal to 3.0 milliseconds and smaller than 3.5 milliseconds is substituted by a load rank 2, and the period of greater than or equal to 3.5 milliseconds and smaller than or equal to 4.0 milliseconds is substituted by a load rank 4.

That is, the load level 0 corresponds to the ranks 0 and 1. Because the rank 1 corresponds to a part of the period of the load level 0, the monitor microcomputer 99 can start reception of CAN frames earlier than the control microcomputer 98. For example, if the period is 2.5 milliseconds, the load level is 0 and the rank is 1; if the period is 3.0 milliseconds, the load level is 1 and the rank is 2; if the period is 3.5 milliseconds, the load level is 2 and the rank is 3; and if the period is 4.0 milliseconds, the load level is 3 and the rank is 3.

[Example of WDC Signal]

Figure 6:
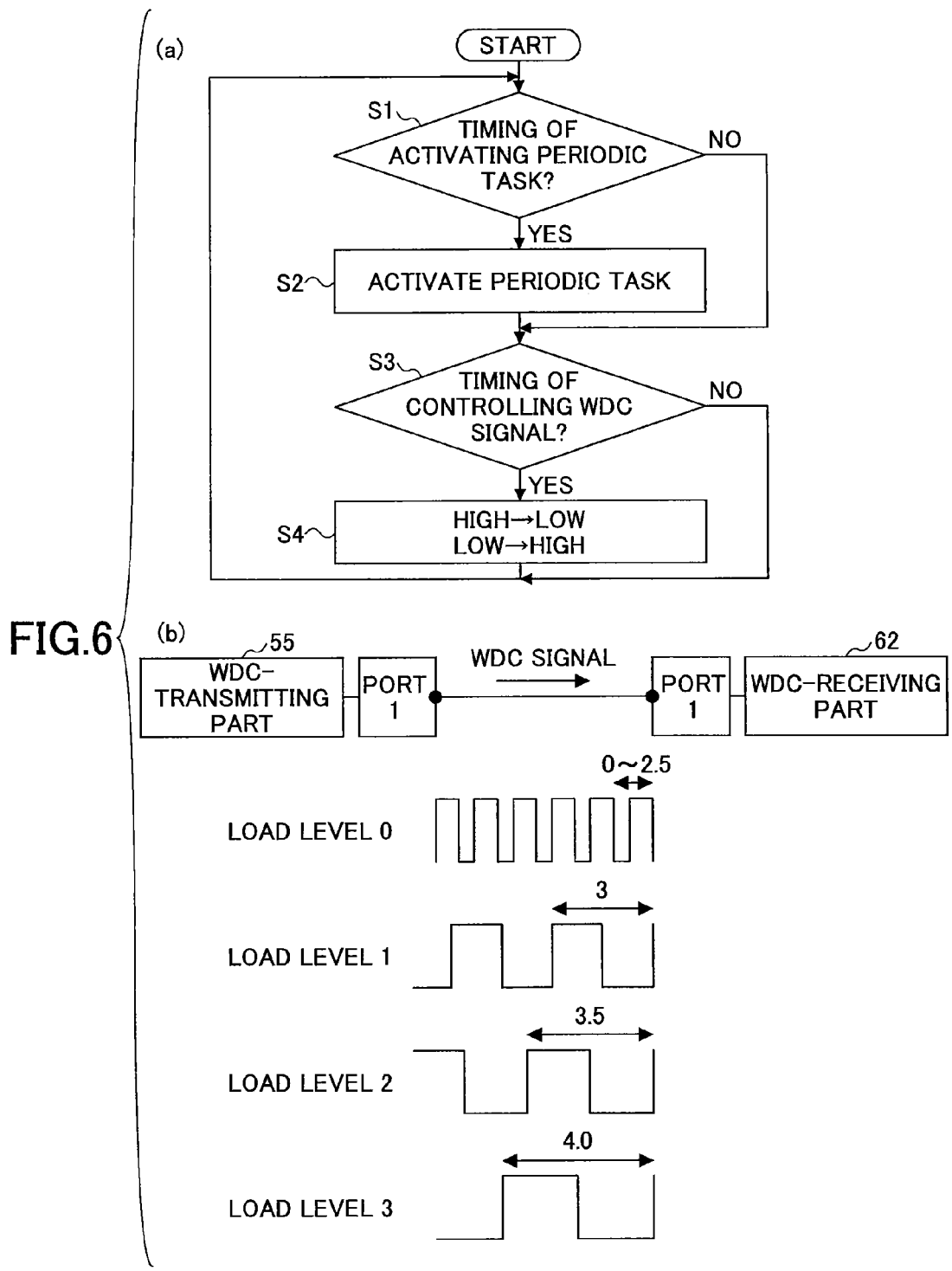
FIG. 6 is an example of a flowchart illustrating a procedure of transmitting the WDC signal by a WDC-transmitting part.

FIG. 6-(*a*) is an example of a flowchart illustrating a procedure of the WDC-transmitting part 55 transmitting a WDC signal, and FIG. 6-(*b*) is an example of a diagram for schematically explaining a relationship between a load level and the WDC signal.

The WDC-transmitting part 55 switches the WDC signal between ON and OFF in a procedure of activating a periodic task. As illustrated in the figure, the monitor microcomputer 99 determines whether it is an activation timing of the periodic task in an operation procedure repeatedly performed for each cycle period (S1). If it is an activation timing of a periodic task, the periodic task is activated (S2).

The WDC-transmitting part 55 determines whether it is a control timing of the WDC signal based on the period decided by the period-deciding part 53 (S3). For example, if the period is 2.0 milliseconds, a control timing is reached every 1.0 millisecond.

If the control timing is reached (Yes of S3), the WDC-transmitting part 55 switches between high and low of the WDC signal (S4). That is, if the status of the port 1 is high, it is changed into low, and if low, changed into high. By repeating this, the WDC signal having a period decided by the period-deciding part 53 is output from the port 1. As mentioned above, because the WDC signal is output by means of software, the monitor microcomputer 99 can estimate that the control microcomputer 98 is executing programs normally.

In addition, the WDC signal may be output using a pulse output circuit, which is generally incorporated in a microcomputer. In this case, the pulse output circuit can output a WDC signal when the WDC-transmitting part 55 merely sets a value corresponding to the period to a timer. However, in this case, many microcomputers may continuously output the WDC signal even if an abnormality occurs in a state of executing programs by the control microcomputer 98. Thus, in the present embodiment, it is preferable to use a pulse output circuit, which stops outputting pulses unless an output is instructed periodically by means of software As illustrated in the figure, the period of the WDC signal becomes larger (the frequency becomes smaller) as the load level becomes larger. The monitor microcomputer 99 can estimate a load level of the control microcomputer 98 based on the period of the WDC signal.

Because the WDC signal is a signal to clear a measure time, the WDC signal according to the present embodiment includes two functions that are a function to clear the measure time and a function to notify of the load level. As mentioned above, because the process load information can be transmitted to the monitor microcomputer 99 by being overlapped on the WDC signal, there is no need to provide a hardware change such as a new port being provided in each of the two microcomputers according to the present embodiment.

It should be noted that the measure time register 70 is configured such that a maximum measure time does not overflow even if the period fluctuates at maximum value (for example, 4.0 milliseconds).

Additionally, although it is preferable to overlap the process load information on the WDC signal, it is possible to notify of a value of process load itself from a different port through a serial communication or the like.

[Period Calculation of Monitor Microcomputer]

Figure 7:
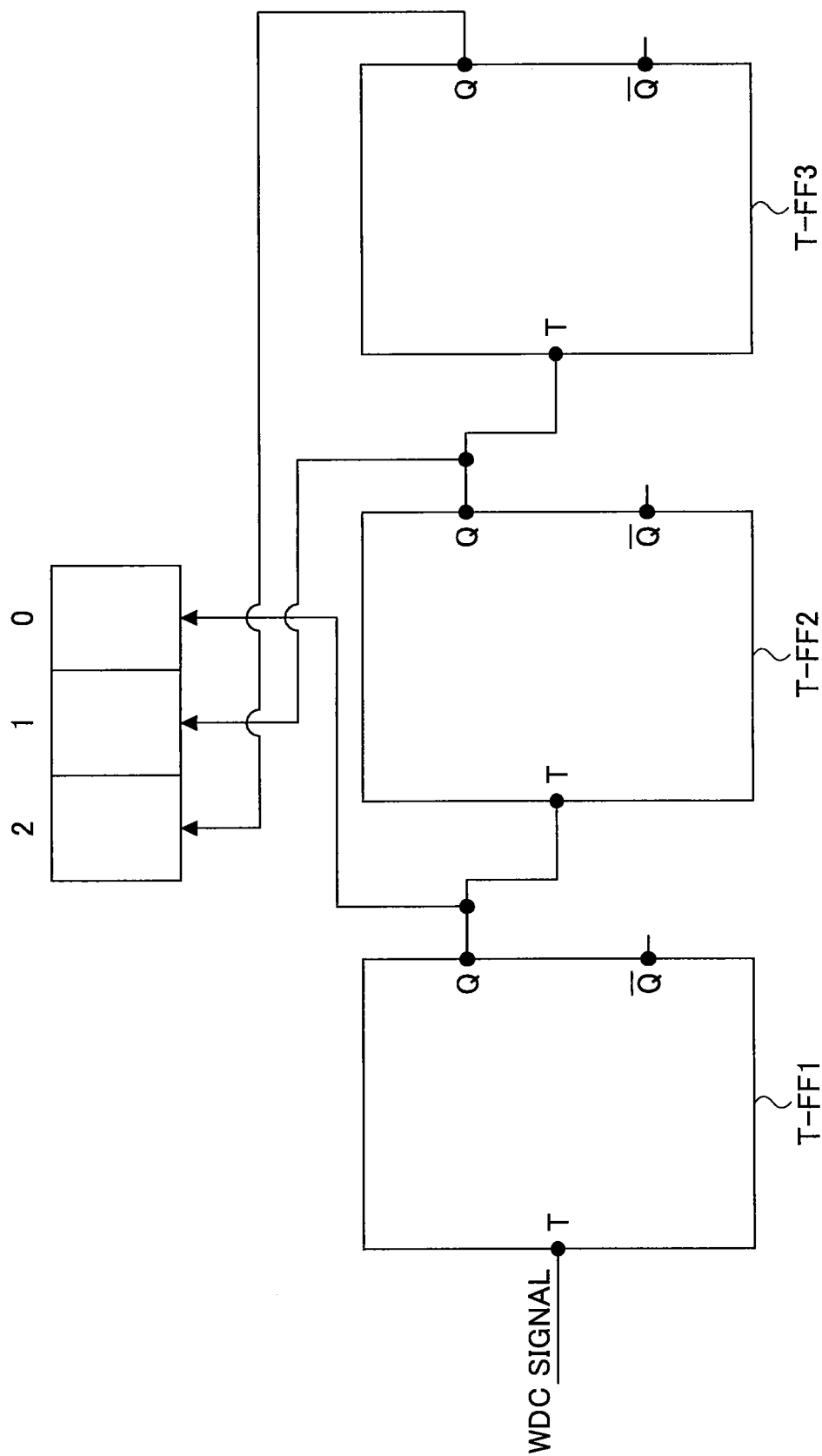
FIG. 7 is an example of a diagram for explaining an operation of a period by a period-calculating part of the monitor microcomputer.

FIG. 7 is an example of a diagram for explaining a calculation of a period by the period-calculating part 63 of the monitor microcomputer 99. A general count circuit, which counts a clock, is used to calculate a period. In the figure, a maximum of 3-bit value can be counted by a count circuit connected with three T-FF circuits 1 to 3. The T-FF circuits 1 to 3 invert an output of a Q-terminal each time a rising edge is input to a T-terminal.

When a rising edge of the WDC signal is input to the T-terminal of the T-FF circuit, the output of the Q-terminal becomes 1. When a next rising edge of the WDC signal is input to the T-terminal, the output of the Q-terminal becomes 0 and the output of the Q-terminal of the T-FF circuit becomes 1. Accordingly, a number of pulses of the WDC signal is recorded in the count circuit.

The period-calculating part 63 reads a count value for each cycle period, and calculates the period of the WDC signal as follows.

period of WDC signal=count value/cycle period

Because the cycle period is previously determined, the period-calculating part 63 can acquire the period of the WDC signal by merely reading the count value of the count circuit and performing a simple division. It should be noted that the period-calculating part 63 clears the count value after reading the count value. For example, if the cycle period is 8 milliseconds, the period of the WDC signal is as follows.

count value is 8→period=1 millisecond count value is 4→period=2 milliseconds count value is 2→period=4 milliseconds It should be noted that when a result of division does not match any one of values (1.0 to 4.0) which the period of the WDC signal can take, it is substituted by a closest period. By doing this, the period-calculating part 63 can acquire the period of the WDC signal transmitted by the monitor microcomputer.

[Specify Rank]

The load-specifying part 64 specifies a rank associated with the period calculated by the period-calculating part 63 by referring to the period decision table 67. As illustrated in FIG. 5, for example, if the period is greater than or equal to 1.0 millisecond and smaller than 2.5 milliseconds, the rank is specified as 0; if the period is greater than or equal to 2.5 milliseconds and smaller than 3.0 milliseconds, the rank is specified as 1; if the period is greater than or equal to 3.0 milliseconds and smaller than 3.5 milliseconds, the rank is specified as 2; and if the period is greater than or equal to 3.5 and smaller than and equal to 4.0 milliseconds, the rank is specified as 3.

[Designate Reception Data]

Figure 8:
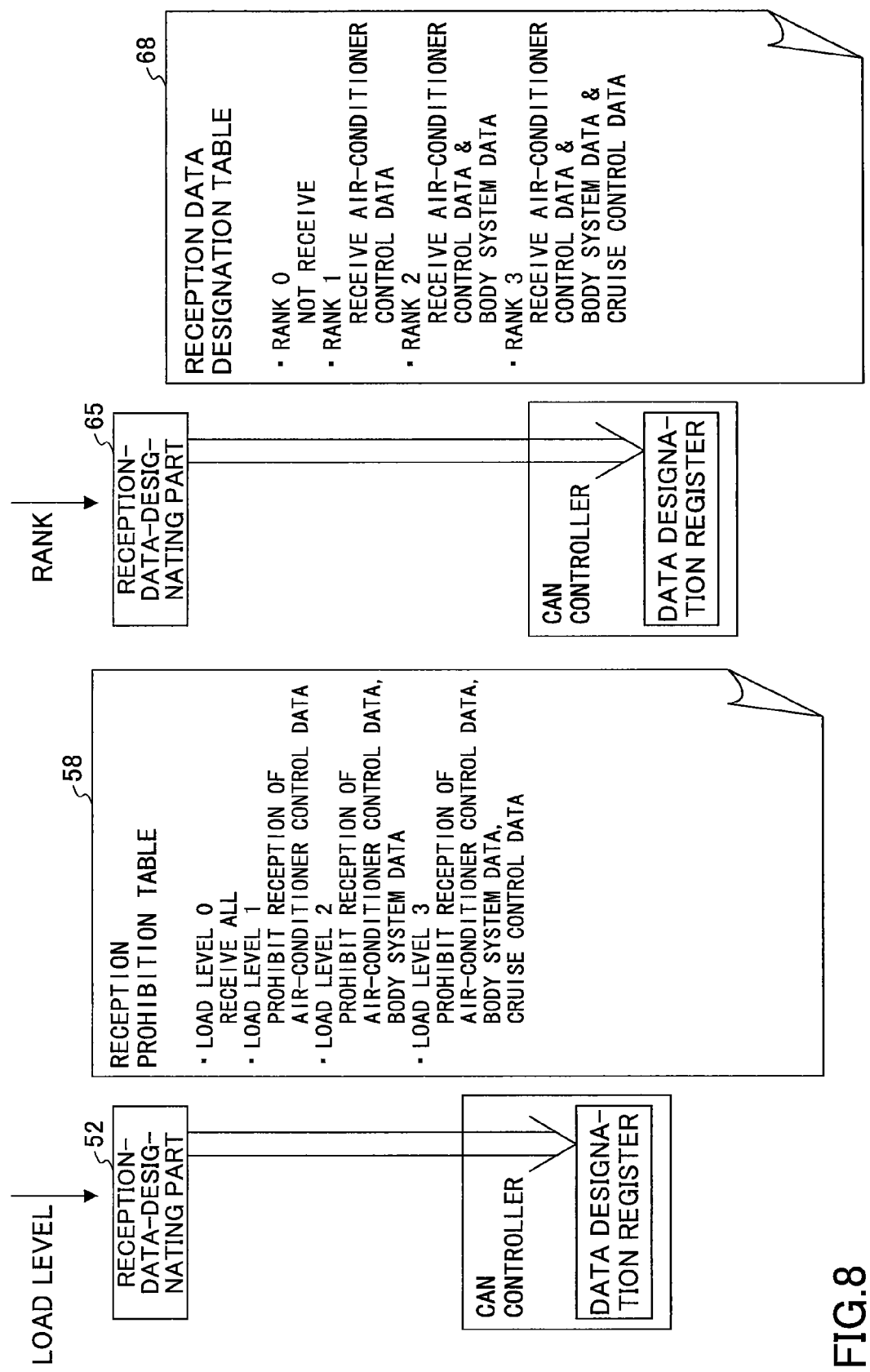
FIG. 8 is an example of a diagram for explaining designation of a CAN frame received by a CAN controller.

FIG. 8 is an example of a diagram for explaining a designation of CAN frames received by the CAN controllers 18 and 38. The CAN frames to be received by the control microcomputer 98 are previously determined when developing or manufacturing the HV-ECU 100. The reception-data-designating part 52 sets to a data designation register 59 a CAN ID of the CAN frame to be received at a time of power ON of a vehicle. Thereafter, the CAN controller 18 selectively receives only the CAN frames of the CAN ID set in the data designation register 59. It should be noted that the power ON refers to a condition that an engine start operation (IG-ON) of a vehicle having only an engine as a power source is performed or a start operation of a main system of a hybrid vehicle (including a plug-in hybrid vehicle) and an electric vehicle is performed.

Then, the reception-data-designating part 52 reduces a number of kinds of CAN frame, which the CAN controller 18 receives, in response to a load level determined by the load-monitoring part 51 by referring to a reception stop table 58. Specifically, a CAN ID set in the data designation register 59 is deleted.

case of load level 1: stop receiving air-conditioner control data case of load level 2: stop receiving air-conditioner control data and body system data case of load level 3: stop receiving air-conditioner control data, body system data and cruise control data As mentioned above, a number of kinds of CAN frame to be received (that is, a number) is reduced as the load level becomes larger. In the reception stop table 58, the load level and the CAN frame are associated so that reception of a CAN frame is stopped from a CAN frame having a lower load level as a priority order thereof is lower. By doing this, reception of CAN frame having a lower priority order can be stopped earlier. Additionally, the process load of the control microcomputer 98 is caused to be reduced because a frequency of reception interrupt is reduced.

However, it is possible that an optimum control becomes difficult unless the control microcomputer 98 does not receive a CAN frame even if the CAN frame has a low priority order. Thus, the monitor microcomputer 99 receives CAN frames which the control microcomputer 98 stops receiving.

As to the monitor microcomputer 99, there is no CAN frame to be received, or if there is, a number thereof is small. When a power of a vehicle is turned on, the reception-data-designating part 65 of the monitor microcomputer 99 sets the CAN ID of a CAN frame to be received in a data designation register.

Then, the reception-data-designating part 65 increases a number of kinds of CAN frame, which the CAN controller 18 receives, in response to a rank specified by the load-specifying part 64 by referring to a reception data designation table 68. Specifically, a CAN ID is added and registered in the data designation register 69.

case of rank 1: receive air-conditioner control data case of rank 2: receive air-conditioner control data and body system data case of rank 3: receive air-conditioner control data, body system data and cruise control data As mentioned above, in the reception data designation table 68, CAN frames are registered so that CAN frames, which the control microcomputer 98 stops receiving, are received by the monitor microcomputer 99. Because the CAN frames, which the monitor microcomputer 99 received, are transferred to the control microcomputer 98 through a serial communication, the control microcomputer 98 can receive CAN frames having a low priority order though there is a time delay.

It should be noted that the reception stop table 58 is previously mounted on the control microcomputer 98, and the reception data designation table 68 is previously mounted on the monitor microcomputer 99. However, the control microcomputer 98 can create the reception data table 58 and the monitor microcomputer 99 can create the reception data designation table 68 by a developer giving a load level and a CAN ID to the control microcomputer 98 while associating them with each other and giving a rank and a CAN ID to the monitor microcomputer 99 while associating them with each other. In this case, what is desirable to do is, for example, to cause a priority of data to be higher as a frequency of reception of the data is higher.

[Regarding Serial Communication]

Figure 9B:
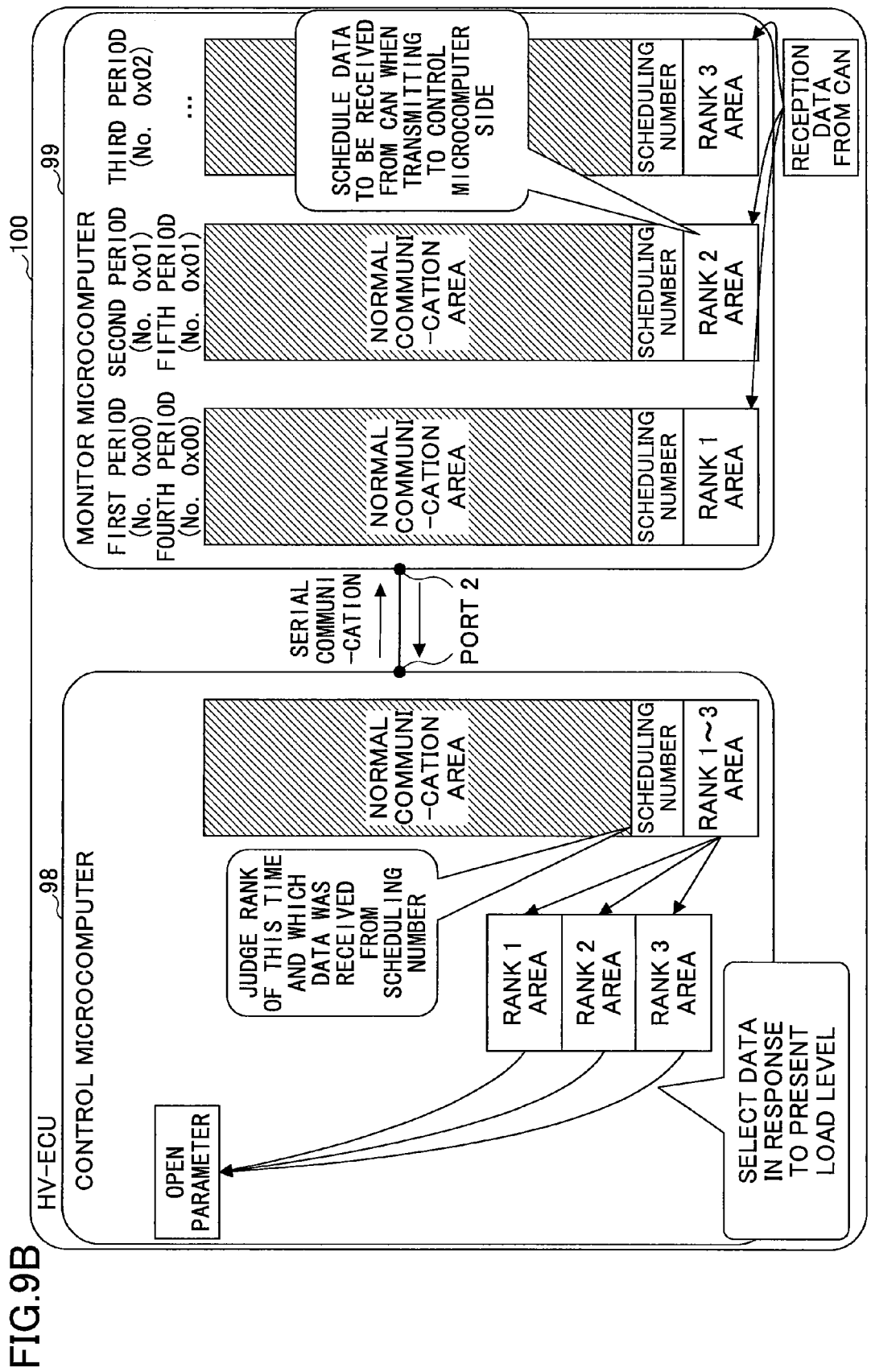
FIG. 9B is an example of a diagram for explaining transmission of a CAN frame by DMAC.
Figure 9C:
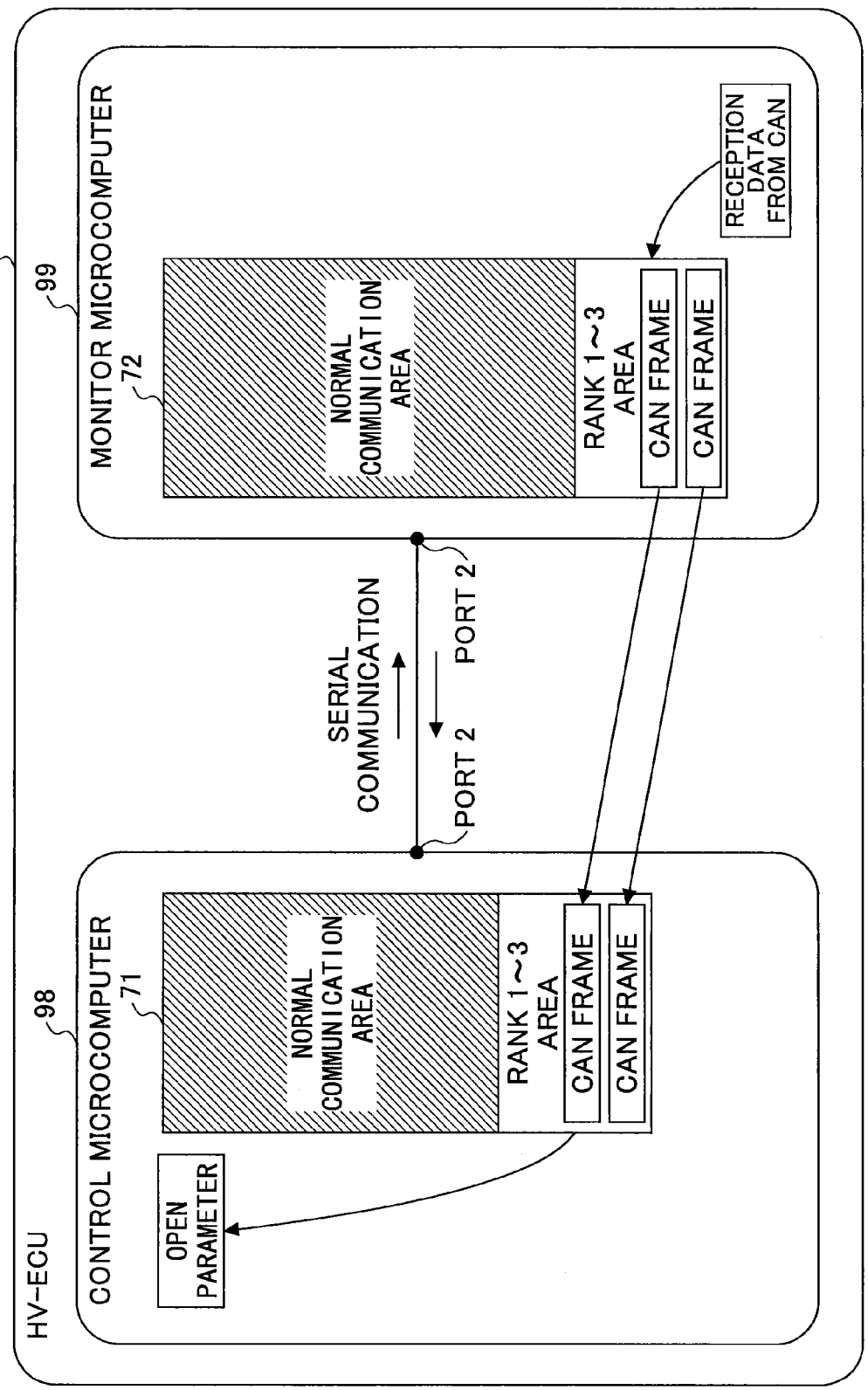
FIG. 9C is an example of a diagram for explaining transmission of a CAN frame by DMAC.

FIG. 9A through FIG. 9C are examples of a diagram for explaining a transmission of CAN frames through a serial communication. The CAN frames received by the CAN controller 38 of the monitor microcomputer 99 are stored in the DMA buffer of the RAM 32. An area of the DMA buffer 72 is previously divided, and the CAN controller 38 respectively stores CAN frames received as rank 1 in an area 1, CAN frames of which reception is started as a rank 2 in an area 2, and CAN frames of which reception is started as a rank 3 in an area 3.

Such an allocation can be realized by the CAN controller 38 changing a sender address, which is to be set in a DAMC based on a CAN ID. Alternatively, the CAN controller 38 may change an address of a destination of storage between the areas 1 through 3 based on a CAN ID. Although a reception interrupt occurs for each time the CAN controller 38 receives one CAN frame, there is no inconvenience happens because a process load of the monitor microcomputer 99 is not so high.

Here, a cycle period at which the monitor microcomputer 99 makes a serial communication through the port 2 is previously determined. Thus, there may be a case where the CAN controller 38 receives CAN frames of the same kind before the monitor microcomputer 99 transmits CAN frames of the DMA buffer to the control microcomputer 98. In this case, the DMAC 36 overwrites the CAN frames of the DMA buffer 72. By doing this, a number of CAN frames to be transmitted to the control microcomputer 98 can be reduced, and only new CAN frames can be transferred.

Then, the transmission-instructing part 66 of the monitor microcomputer 99 stores the CAN frames, which are stored in the DMA buffer 72, in the packet of serial communication each time the cycle period is reached, and transmits them to the control microcomputer 98. For example, there are following three modes in the transmission mode.

i) All CAN frames of the areas 1 through 3 are transmitted by one time transmission cycle (FIG. 9A).

Even if CAN frames are not stored in all of the areas 1 through 3, the transmission-instructing part 66 transfers all data of the areas 1 through 3. By doing this, the CAN frames corresponding to the ranks 1 through 3 can be stored at predetermined addresses of the RAM 32 of the control microcomputer 98. It should be noted that when transmitting a CAN frame which is not received, a dummy ID indicating an invalid value is set to the CAN ID of the CAN frame. Accordingly, the transmission-instructing part 66 creates a communication packet from data of all areas of the DMA buffer 72, and writes it in the transmission buffer of the port 2.

ii) Schedule the rank of CAN frames to be stored in the same area (FIG. 9B).

Because the RAMS 12 and 32 of the control microcomputer 98 and the monitor microcomputer 99 are designed as necessary minimum, it is possible that a sufficient size cannot be reserved for the DMA buffer 71. In such a case, the areas 1 through 3 are not provided individually, and each of the control microcomputer 98 and the monitor microcomputer 99 retains one area for storing CAN frames.

The monitor microcomputer 99 switches CAN frame to be received from the CAN bus each time the CAN frames of all areas are transmitted to the control microcomputer 98. Additionally, a rank of the CAN frame received is stored in the area as a scheduling number.

Although three combinations of the normal communication area and the area are illustrated in order to indicate that the CAN frame has been switched in the figure, actually there is one, and each of them corresponds to the period.

case of rank 1: Receive CAN frames of rank 1 in each period, and store them in the area. "1" which indicates rank 1 is stored as a scheduling number.

case of rank 2: Receive CAN frames of rank 1 in the first period, and store them in the area together with a scheduling number "1". Receive CAN frames of rank 2 (excluding CAN frames of rank 1) in the second period, and store them in the area together with a scheduling number "2".

case of rank 3: Receive CAN frames of rank 1 in the first period, and store them in the area together with a scheduling number "1". Receive CAN frames of rank 2 (excluding CAN frames of rank 1) in the second period, and store them in the area together with a scheduling number "2". Receive CAN frames of rank 3 (excluding CAN frames of ranks 1 and 2) in the third period, and store them in the area together with a scheduling number "3". Thereafter, repeat the above.

It should be noted that the order of receiving the CAN frames in the case of rank 3 is not limited to the above, and reception may be made in an order in which the CAN frames of rank 3 are received first. Additionally, a frequency of reception is not necessarily equal, and weighting may be applied to the scheduling in response to the priority of ranks 1 through 3.

The control microcomputer 98 refers to the scheduling number and judges the rank corresponding to the CAN frame of the area which has been transmitted. That is, because it can be appreciated that if the scheduling number is "3", it is the CAN frame of rank 3, if the load level is 3, the CAN frame is read.

Then, in the mode of FIG. 9B, there are two timings in the timing at which the control microcomputer 98 reads data from the areas.

(a) After all CAN frames of ranks 1 through 3 get together, read the CAN frames in response to the load level. In this case, a read timing of the CAN frames is slightly delayed.

(b) Judge the load level at a timing of receiving from the monitor microcomputer, and read it if it is a CAN frame corresponding to the load level. In this case, a delay in the read timing of CAN frames can be suppressed.

As mentioned above, by reserving a small area, it can be suppressed to squeeze the normal communication area. It is effective for a case where acquiring the normal communication area is requested more strongly than acquiring a real time nature of data.

(iii) Transmit by a CAN frame unit (FIG. 9C)

Only CAN frames received may be transmitted. The transmission-instructing part 66 transmits CAN frames in an order in which the oldest CAN frame is first in each cycle period. In a case where the monitor microcomputer 99 does not receive CAN frames of rank 3, the transmission-instructing part 66 does not transmit CAN frames of rank 3. According to this, a transmission time can be reduced.

It should be noted that CAN frames can be compressed at the time of transmitting in any one of cases (i) through (iii). According to this, a transmission time can be reduced. Additionally, because a CAN ID is included in a CAN frame, the control microcomputer 98 can discriminate each CAN frame.

Set in the DMAC 16 of the control microcomputer 98 are a port 2 as a transferer, a head address of the DMA buffer 71 of the RAM 12 as a transferee and a transfer size (for example, a size of the DMA buffer 71, a size of one area). When the port 2 of the control microcomputer 98 starts receiving data, the DMAC 16 causes data stored in the reception buffer of the port 2 to be stored in an order staring from the head address of the DMA buffer 71. When an amount of transfer reaches a transfer size, an interrupt is applied to the CPU 11 through the INTC 14.

Because the reception interrupt by the DMAC 16 occurs for each transfer size mentioned above (for example, several hundred bytes), an increase in the process load of the control microcomputer 98 due to an interrupt process can be suppressed. On the other hand, the maximum length of the data field of the CAN frame (in case of data frame) is only 8 bytes.

The data-reading part 54 of the control microcomputer 98 can read all read CAN frames from the DMA buffer 71 by a reception interrupt of the DMAC 16. According to the transmission mode (i), CAN frames of rank 1 is stored in the area 1, CAN frames of rank 2 is stored in the area 2, and CAN frames of rank 3 is stored in the area 3, respectively. In the transmission mode (ii), the data-reading part 54 determines a rank in response to a cycle because a kind of CAN frames stored in the DMA buffer 71 changes. In the transmission mode (iii), CAN frames can be discriminated by a CAN ID although correspondence between storage address and rank of a CAN frame is not fixed.

The data-reading part 54 of the control microcomputer 98 reads only CAN frames, which the reception-data-designating part 52 stops receiving, from the DMA buffer 71. That is, the data-reading part 54 selects CAN frames to be read from the DMA buffer in response to the load level. The present load level is notified by the load-monitoring part 51. Accordingly, in the transmission mode (i), an area of a destination of access by the DMA buffer 71 can be discriminated in response to the load level. In the transmission mode (ii), CAN frames can be determined in response to the load level and a process repeat cycle. For example, in the load level of 3, air-conditioner control data is stored in the DMA buffer 71 in cycle 1; A/C data is stored in the DMA buffer 71 in cycle 2; and cruise control data is stored in the DMA buffer 71 in cycle 3. In the transmission mode (ii), CAN frames are discriminated by a CAN ID.

Based on the transmission modes mentioned above, the data-reading part 54 reads CAN frames.

In a case of load level 1, because the CAN ID of "air-conditioner control data" is registered in the reception stop table 58, the data-reading part 54 reads only "air-conditioner control data" from the DMA buffer 71.

Similarly, in a case of load level 2, the data-reading part 54 reads only "air-conditioner control data and body system data" from the DMA buffer 71.

Similarly, in a case of load level 3, the data-reading part 54 reads only "air-conditioner control data, body system data and cruise control data" from the DMA buffer 71.

[Operation Procedure]

A description is given, with reference to FIG. 10 through 13, of an operation procedure of the monitor microcomputer 99.

<Stop of Reception of CAN Frame>

Figure 10:
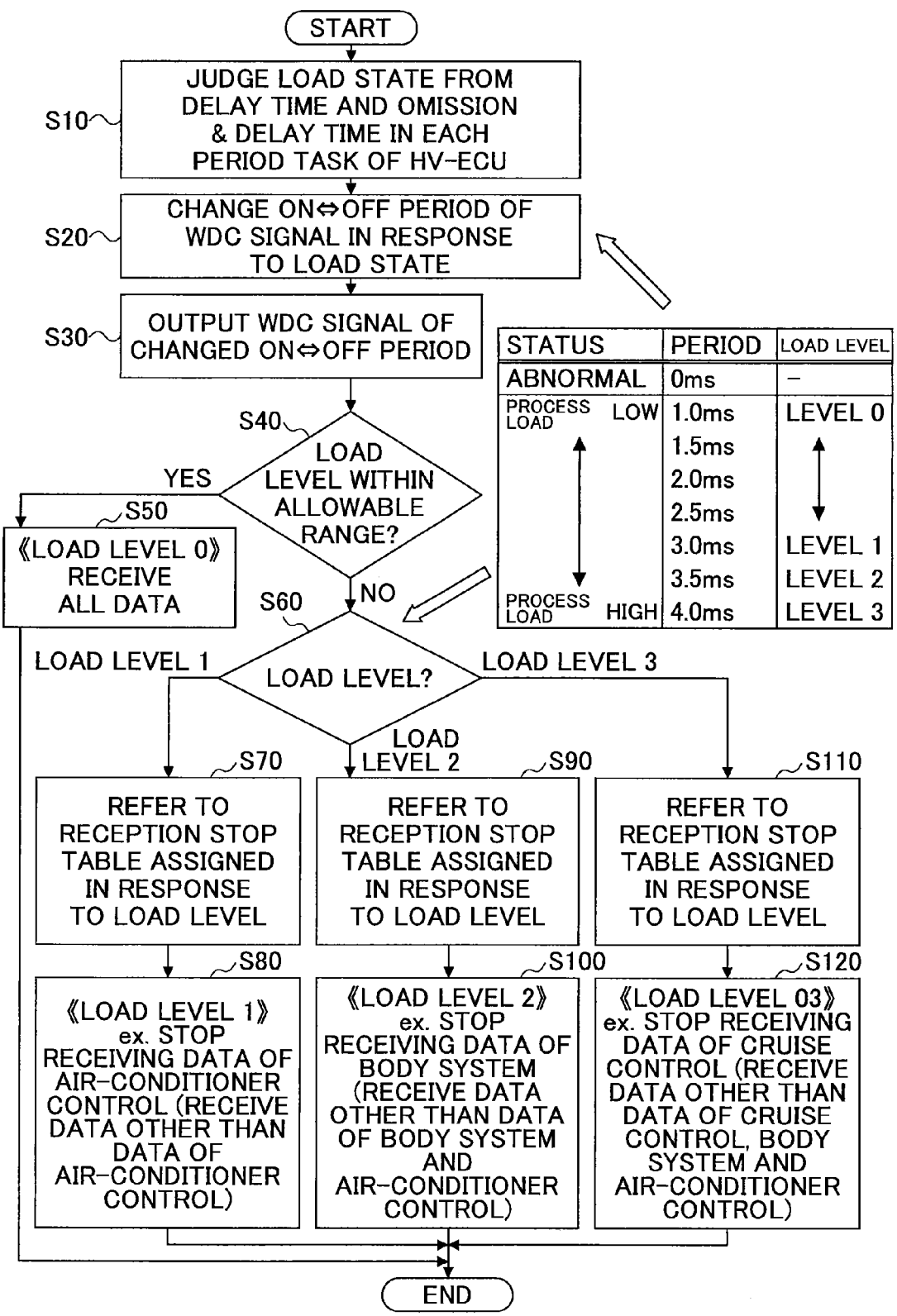
FIG. 10 is an example of a flowchart illustrating a procedure of the control microcomputer to control a CAN frame to be received in response to a process load.

FIG. 10 is an example of a flowchart illustrating a procedure to control CAN frames which the control microcomputer 98 receives in response to a process load.

The load-monitoring part 51 monitors a process load for each cycle period, and decides a load level 1 through 4, from the process load (S10).

The period-deciding part 53 decides the period of the WDC signal based on the load level by referring to the period decision table (S20).

Then, the WDC-transmitting part 55 changes a period for switching the pulses output from the port 1 between high and low in accordance with the newly decided period.

Then, the reception-data-designating part 52 determines whether the load level is within an allowable range (S40). In the present embodiment, the allowable range refers to that the load level is 0.

If the load level is within the allowable range (Yes of S40), the reception-data-designating part 52 sets all predetermined CAN IDs in the data designation register 59 of the CAN controller 18 (S50).

If the load level is not within the allowable range (No of S40), the reception-data-designating part 52 performs the following process in response to the load level (S60).

In a case of load level 1, the reception-data-designating part 52 refers to the reception stop table 58, and reads a CAN ID corresponding to the load level 1 (S70).

Then, the reception-data-designating part 52 deletes the CAN ID read in step S70 from the data designation register 59 so as to stop receiving, for example, the air-conditioner control data (S80).

In a case of load level 2, the reception-data-designating part 52 refers to the reception stop table 58, and reads a CAN ID corresponding to the load level 2 (S90).

Then, the reception-data-designating part 52 deletes the CAN ID read in step S90 from the data designation register 59 so as to stop receiving, for example, the air-conditioner control data and the body system data (S100).

In a case of load level 3, the reception-data-designating part 52 refers to the reception stop table 58, and reads a CAN ID corresponding to the load level 3 (S110).

Then, the reception-data-designating part 52 deletes the CAN ID read in step S110 from the data designation register 59 so as to stop receiving, for example, the air-conditioner control data, the body system data and the cruise control data (S120).

Thereafter, the control microcomputer 98 repeats the process of S10 through S120 for each cycle period.

Additionally, the control microcomputer 98 and the monitor microcomputer may acquire synchronization. In this case, a notification that the reception-data-designating part 52 stops receiving CAN frames is sent to the monitor microcomputer 99 in step S60. Then, the reception of CAN frames is stopped after a predetermined time at which the monitor microcomputer 99 starts receiving the CAN frames, has passed.

<Start of Reception of CAN Frame>

Figure 11:
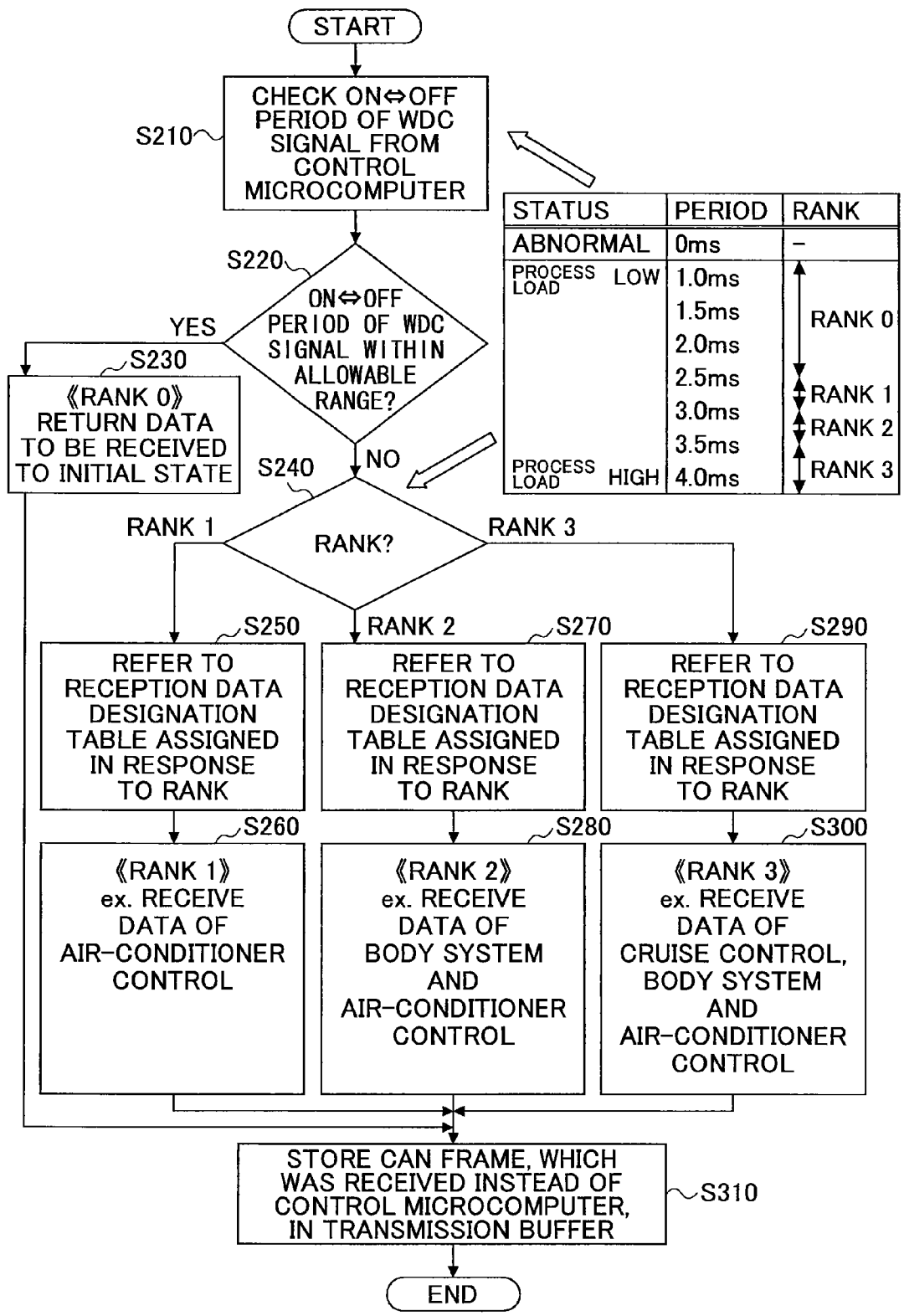
FIG. 11 is an example of a flowchart illustrating a procedure of the monitor microcomputer to start reception of a CAN frame in response to a process load

FIG. 11 is an example of a flowchart illustrating a procedure of the monitor microcomputer starting reception of CAN frames in response to a process load.

The WDC-receiving part 62 always receives a WDC signal. The period-calculating part 63 calculates a period of pulses of the WDC signal (S210). Additionally, the load-specifying part 64 specifies a rank associated with the period by referring to the period decision table.

The reception-data-designating part 65 determines whether the period is within an allowable range (S220). The allowable range refers to a rank 0. Because a determination threshold value of the allowable range is a value more severe than the load level 0, the monitor microcomputer 99 can start receiving CAN frames earlier than the control microcomputer 98.

If the period is within the allowable range (Yes of S220), the reception-data-designating part 65 returns the data designation register 69 to an initial state (S230). That is, it is changed to a setting of receiving the CAN frames which are to be received by the monitor microcomputer 99 when a power is turned on. If the setting of the data designation register 69 has not been changed at all, nothing will be done.

If the period is not within the allowable range (No of S220), the reception-data-designating part 65 performs the following process in response to a rank (S240).

In a case of rank 1, the reception-data-designating part 65 refers to the reception data designation table 68, and reads a CAN ID associated with rank 1 (S250). As mentioned above, the monitor microprocessor 99 can start receiving CAN frames earlier than the control microcomputer 98 stops receiving. Thereby, there is no need to synchronize the control microcomputer 98 and the monitor microcomputer 99, which suppresses an increase in the process load of the control microcomputer 98.

Then the reception-data-designating part 65 starts receiving, for example, air-conditioner control data by setting the CAN ID read in step S250 to the data designation register 69 (S260).

In a case of rank 2, the reception-data-designating part 65 refers to the reception data designation table 68, and reads a CAN ID associated with rank 2 (S270).

Then the reception-data-designating part 65 starts receiving, for example, air-conditioner control data and body system data by setting the CAN ID read in step S270 to the data designation register 69 (S280).

In a case of rank 3, the reception-data-designating part 65 refers to the reception data designation table 68, and reads a CAN ID associated with rank 2 (S290).

Then the reception-data-designating part 65 starts receiving, for example, air-conditioner control data, body system data and cruise control data by setting the CAN ID read in step S290 to the data designation register 69 (S300).

Thereafter, the transmission-instructing part 66 stores CAN frames, which are received on behalf of the control microcomputer, in the transmission buffer of the port 2 (S310).

<Transfer CAN Frame from Monitor Microcomputer to Control Microcomputer>

Figure 12:
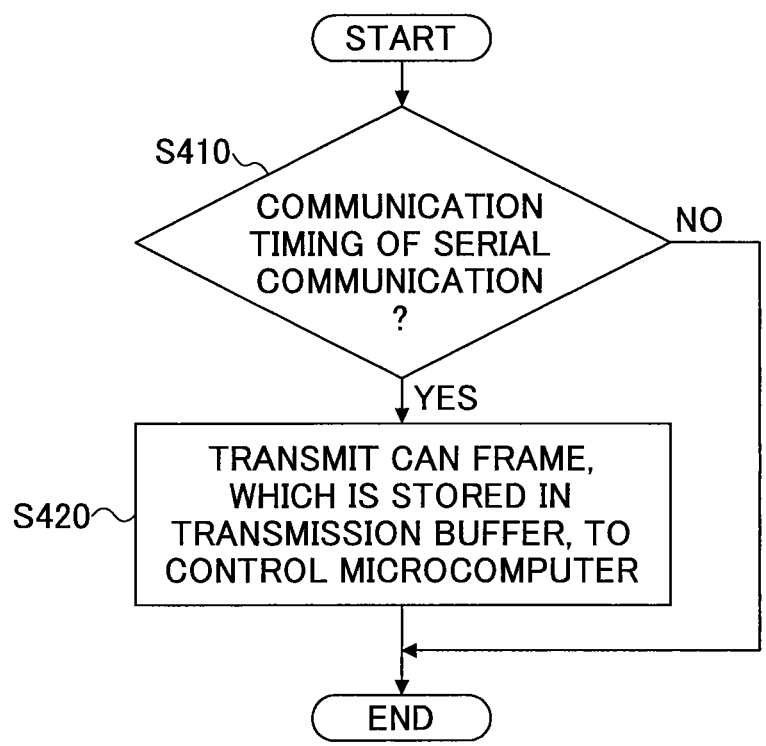
FIG. 12 is an example of a flowchart illustrating a procedure of the monitor microcomputer to transmit a CAN frame to the control microcomputer.

FIG. 12 is an example of a flowchart illustrating a procedure of the monitor microcomputer 99 transmitting CAN frames to the control microcomputer.

The transmission-instructing part 66 determines whether it is a communication timing of serial communication in each cycle period (S410).

Then, when it becomes the communication timing, the transmission-instructing part 66 transmits the CAN frames stored in the DMA buffer 72 to the port 2 of the control microcomputer 98 through the serial communication (S420).

<Use of Transferred CAN Frame by Control Microcomputer>

Figure 13:
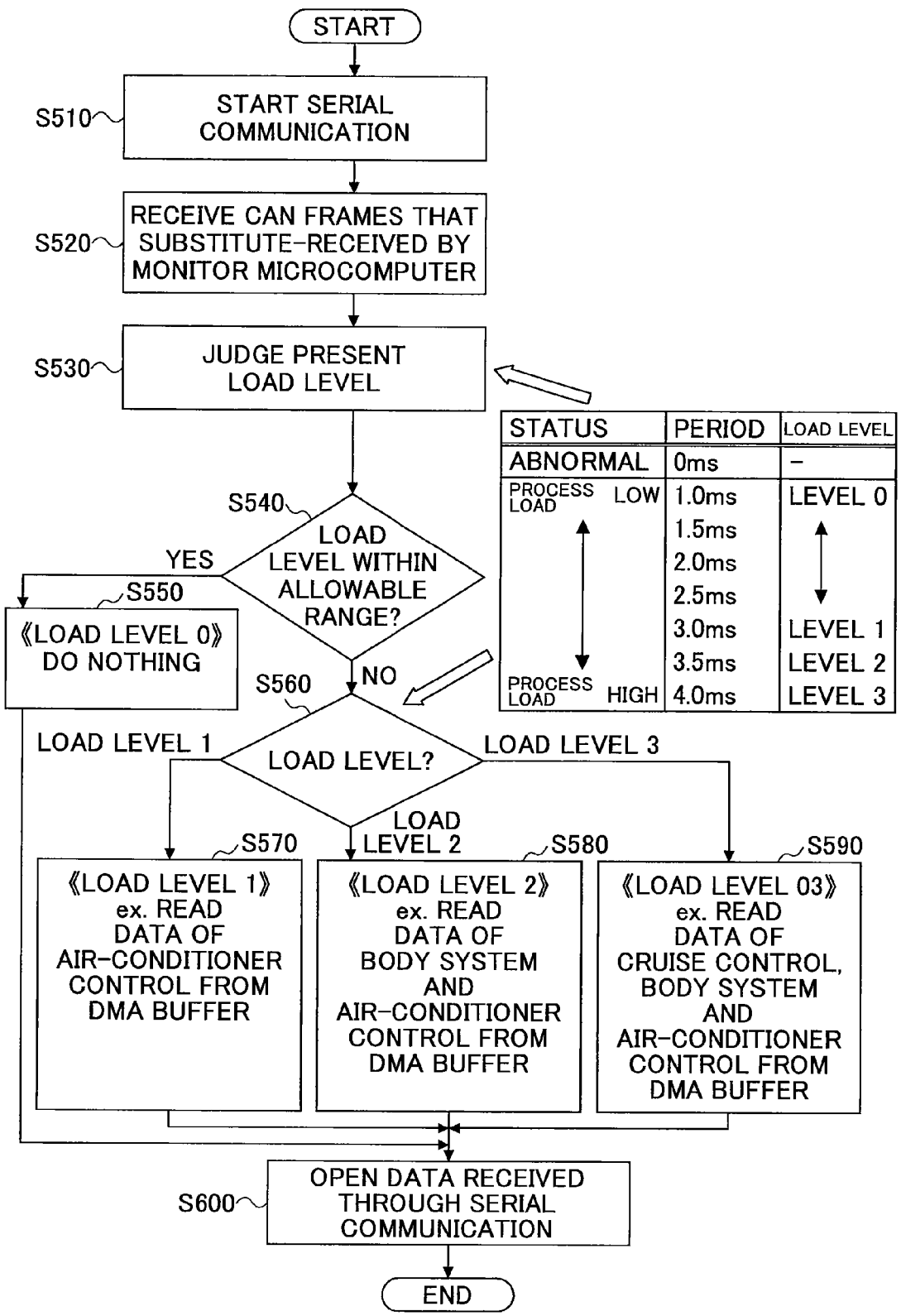
FIG. 13 is an example of a flowchart illustrating a procedure of the control microcomputer to receive a CAN frame from the monitor computer and read it from a DMA buffer.

FIG. 13 is an example of a flowchart illustrating a procedure of the control microcomputer 98 receiving CAN frames from the monitor microcomputer 99 and reading it from the DMA buffer 71.

First, the port 2 of the control microcomputer 98 starts receiving CAN frames (S510). At the time of starting, no interrupt occurs in the CPU 11.

The DMAC 16 of the control microcomputer 98 sequentially stores the CAN frames, which the port 2 received, in the DMA buffer 71 in an order starting from a previously determined head address (S520). Upon reception of CAN frames of a transfer size which is previously determined to the DMAC 16, a reception completion is announced by applying a reception interrupt to the CPU 11.

The data-reading part 54 requests the load-monitoring part 51 to notify of the present load level (S530).

The data-reading part 54 determines whether the load level is within an allowable range (S540). In the present embodiment, the allowable range refers to that the load level is 0.

If the load level is within the allowable range (Yes of S540), the data-reading part 54 does not read CAN frames from the DMA buffer 71 (S550). That is, because the control microcomputer 98 receives all CAN frames at the present load level, there is no need to receive CAN frames from the monitor microcomputer 99.

The reason for occurrence of a condition in which the monitor microcomputer 99 transmits CAN frames even though the load level of the control microcomputer 8 is 0 is because the monitor microcomputer 99 starts receiving CAN frames earlier than the control microcomputer 98 stops receiving CAN frames. According to this, reception leakage of CAN frames by the control microcomputer 98 is prevented.

If the load level of the control microcomputer 98 is 0, the CAN frames received by the control microcomputer 98 have higher real-time properties than the CAN frames received from the monitor microcomputer 99. Accordingly, the control microcomputer 98 can perform a control using latest data by the data-reading part 54 not reading CAN frames.

It should be noted that there may occur a case in which reception leakage of CAN frames by the control microcomputer 98 occurs because CAN frames which the control microcomputer 98 does not receive are not received by the monitor microcomputer 99. For example, that is a case in which a reception of CAN frames by the monitor microcomputer 99 is not started in time because the process load of the control microcomputer 98 is sharply increased. It is considered that such a condition rarely occurs, but in this case, the control microcomputer 98 retains the pervious CAN frames to use in a control.

If the load level is not within the allowable range, (No of S540), the data-reading part 54 performs the following process in response to the load level (S560)

In a case of load level 1, the data-reading part 54 reads a CAN ID associated with load level 1 by referring to the reception stop table 58, and reads CAN frame of the read CAN ID from the DMA buffer 71 (S570). That is, for example, air-conditioner control data is read.

In a case of load level 2, the data-reading part 54 reads a CAN ID associated with load level 2 by referring to the reception stop table 58, and reads CAN frame of the read CAN ID from the DMA buffer 71 (S580). That is, for example, air-conditioner control data and body system data are read.

In a case of load level 3, the data-reading part 54 reads a CAN ID associated with load level 3 by referring to the reception stop table 58, and reads CAN frame of the read CAN ID from the DMA buffer 71 (S590). That is, for example, air-conditioner control data, body system data and cruise control data are read.

It should be noted that, if necessary, the data-reading part 54 decompresses the data read in steps S570 through S590

Then, the data-reading part 54 opens the data portion of the CAN frame read in steps S570 through S590 to the task (S600). Open means storing in a predetermined address of a RAM or storing in a parameter of a predetermined parameter name so that the task can be read. According to this, each task can be controlled using data necessary for the control, which is originally received by a CAN frame.

As explained above, the HV-ECU 100 of the present embodiment can reduce a process load by the control microcomputer reducing a number of received CAN frames. Because the control microcomputer 98 receives CAN frames from the monitor microcomputer 99, a reception leakage hardly occurs. Because a WDC signal is used in notification of a load level, there is no need to add a new signal line. Accordingly, a load can be distributed between two microcomputers having different process capacities without increasing the process capacities of the microcomputers.

The invention claimed is:

1. A vehicle electronic control device having a first microcomputer connected to an in-vehicle network and a second microcomputer connected to said in-vehicle network, wherein said first microcomputer includes:
process load level detecting means that detects a process load level of said first microcomputer;
a table in which the process load level is associated with data identification information; and
reception data reducing means that, in a case where said process load level becomes greater than or equal to a first threshold level, stops receiving one or more data which said first microcomputer has received from said in-vehicle network before said process load level becomes greater than or equal to said first threshold value, said second microcomputer includes:
process load level estimating means that estimates said process load level of said first microcomputer;
substitute data receiving means that receives data, which said first microcomputer stops receiving, from said in-vehicle network in a case where said process load level estimated by said process load level estimating means becomes greater than or equal to a second threshold value; and data transmitting means that transmits in a lump a plurality of data received by said substitute data receiving means to said first microcomputer through serial communication, said first microcomputer includes process load level notifying means that notifies of said process load level detected by said process load level detecting means by a period or a frequency of a pulse signal, and said process load level estimating means estimates said process load level of said first microcomputer from the period or frequency of said pulse signal.

2. The vehicle electronic control device as claimed in claim 1, wherein said second microcomputer includes microcomputer monitoring means that monitors a program execution state of said first microcomputer based on said pulse signal transmitted by said first microcomputer.

3. The vehicle electronic control device as claimed in claim 1, wherein said first microcomputer includes:
data receiving means that applies a reception interrupt to said first microcomputer each time data is received from said in-vehicle network; and
buffer transferring means that stores the data which said data transmitting means transmitted through serial communication in a buffer area having a size larger than a size of data which said data receiving means receives in one time reception interrupt, and said buffer transferring means applies a reception interrupt to said first microcomputer in a case where data of a size of said buffer area is received through serial communication.

4. The vehicle electronic control device as claimed in claim 3, wherein said second microcomputer includes a substitute data buffer area that stores data which said substitute data receiving means received and is sectioned into areas for each said process load level;

said buffer area of said first microcomputer is sectioned into areas of a same size corresponding to the areas of said substitute data buffer areas, respectively; and said buffer transferring means stores data of said substitute data buffer area in the corresponding areas of said buffer area in an area unit.

5. The vehicle electronic control device as claimed in claim 3, wherein said buffer transferring means is a direct memory access controller.

6. The vehicle electronic control device as claimed in claim 1, wherein said first threshold value is greater than said second threshold value, and said substitute data receiving means receives data which said first microcomputer schedules to stop receiving from said in-vehicle network earlier than said reception data reducing means stops receiving one or more data.

7. The vehicle electronic control device as claimed in claim 1, wherein said reception data reducing means receives one or more data from said in-vehicle network after notifying said second microcomputer that reception of one or more data is stopped, and said substitute data receiving means starts receiving the data, which said first microcomputer stops receiving, from said in-vehicle network upon receipt of a notification that reception of data from said microcomputer is stopped.

8. A vehicle electronic control device having a first microcomputer connected to an in-vehicle network and a second microcomputer connected to said in-vehicle network, wherein
said first microcomputer includes:
process load level detecting means that detects a process load level of said first microcomputer;
a table in which the process load level is associated with data identification information; and
reception data reducing means that, in a case where said process load level becomes greater than or equal to a first threshold level, stops receiving one or more data which said first microcomputer has received from said in-vehicle network before said process load level becomes greater than or equal to said first threshold value,
said second microcomputer includes:
process load level estimating means that estimates said process load level of said first microcomputer;
substitute data receiving means that receives data, which said first microcomputer stops receiving, from said in-vehicle network in a case where said process load level estimated by said process load level estimating means becomes greater than or equal to a second threshold value; and
data transmitting means that transmits in a lump a plurality of data received by said substitute data receiving means to said first microcomputer through serial communication,
said first microcomputer includes:
data receiving means that applies a reception interrupt to said first microcomputer each time data is received from said in-vehicle network; and
buffer transferring means that stores the data which said data transmitting means transmitted through serial communication in a buffer area having a size larger than a size of data which said data receiving means receives in one time reception interrupt, and
said buffer transferring means applies a reception interrupt to said first microcomputer in a case where data of a size of said buffer area is received through serial communication.

9. The vehicle electronic control device as claimed in claim 8, wherein
said second microcomputer includes a substitute data buffer area that stores data which said substitute data receiving means received and is sectioned into areas for each said process load level;
said buffer area of said first microcomputer is sectioned into areas of a same size corresponding to the areas of said substitute data buffer areas, respectively; and
said buffer transferring means stores data of said substitute data buffer area in the corresponding areas of said buffer area in an area unit.

10. The vehicle electronic control device as claimed in claim 8, wherein said buffer transferring means is a direct memory access controller.

11. A vehicle electronic control device having a first microcomputer connected to an in-vehicle network and a second microcomputer connected to said in-vehicle network, wherein
said first microcomputer includes:
process load level detecting means that detects a process load level of said first microcomputer;
a table in which the process load level is associated with data identification information; and
reception data reducing means that, in a case where said process load level becomes greater than or equal to a first threshold level, stops receiving one or more data which said first microcomputer has received from said in-vehicle network before said process load level becomes greater than or equal to said first threshold value,
said second microcomputer includes:
process load level estimating means that estimates said process load level of said first microcomputer;
substitute data receiving means that receives data, which said first microcomputer stops receiving, from said in-vehicle network in a case where said process load level estimated by said process load level estimating means becomes greater than or equal to a second threshold value; and
data transmitting means that transmits in a lump a plurality of data received by said substitute data receiving means to said first microcomputer through serial communication,
said first threshold value is greater than said second threshold value, and
said substitute data receiving means receives data which said first microcomputer schedules to stop receiving from said in-vehicle network earlier than said reception data reducing means stops receiving one or more data.

12. A vehicle electronic control device having a first microcomputer connected to an in-vehicle network and a second microcomputer connected to said in-vehicle network, wherein
said first microcomputer includes:
process load level detecting means that detects a process load level of said first microcomputer;
a table in which the process load level is associated with data identification information; and
reception data reducing means that, in a case where said process load level becomes greater than or equal to a first threshold level, stops receiving one or more data which said first microcomputer has received from said in-vehicle network before said process load level becomes greater than or equal to said first threshold value,
said second microcomputer includes:
process load level estimating means that estimates said process load level of said first microcomputer;
substitute data receiving means that receives data, which said first microcomputer stops receiving, from said in-vehicle network in a case where said process load level estimated by said process load level estimating means becomes greater than or equal to a second threshold value; and
data transmitting means that transmits in a lump a plurality of data received by said substitute data receiving means to said first microcomputer through serial communication,
said reception data reducing means receives one or more data from said in-vehicle network after notifying said second microcomputer that reception of one or more data is stopped, and
said substitute data receiving means starts receiving the data, which said first microcomputer stops receiving, from said in-vehicle network upon receipt of a notification that reception of data from said microcomputer is stopped.

13. A vehicle electronic control device having a first microcomputer connected to an in-vehicle network and a second microcomputer connected to said in-vehicle network, wherein said first microcomputer includes:
process load level detecting means that detects a process load level of said first microcomputer;
a table in which the process load level is associated with data identification information; and
reception data reducing means that, in a case where said process load level becomes greater than or equal to a first threshold level, stops receiving one or more data which said first microcomputer has received from said in-vehicle network before said process load level becomes greater than or equal to said first threshold value, said second microcomputer includes:
process load level estimating means that estimates said process load level of said first microcomputer;
substitute data receiving means that receives data, which said first microcomputer stops receiving, from said in-vehicle network in a case where said process load level estimated by said process load level estimating means becomes greater than or equal to a second threshold value; and
data transmitting means that transmits in a lump a plurality of data received by said substitute data receiving means to said first microcomputer through serial communication, said first microcomputer includes a first table in which said process load level of a higher level is associated with said data identification information having a higher priority order, said reception data reducing means receives data of said data identification information, which is associated with said process load level in said first table, from said in-vehicle network, said second microcomputer includes a second table in which said process load level of a higher level is associated with said data identification information having a higher priority order, and said substitute data receiving means receives data of said data identification information, which is associated with said process load level estimated by said process load level estimating means in said second table from said in-vehicle network.

\* \* \* \* \*